US007132383B2

(12) United States Patent
Nakajima et al.

(10) Patent No.: US 7,132,383 B2
(45) Date of Patent: *Nov. 7, 2006

(54) POLYMERIZATION CATALYST FOR POLYESTER, POLYESTER PRODUCED WITH THE SAME, AND PROCESS FOR PRODUCING POLYESTER

(75) Inventors: Takahiro Nakajima, Ohtsu (JP); Kenichi Tsukamoto, Ohtsu (JP); Shoichi Gyobu, Ohtsu (JP); Fumikazu Yoshida, Ohtsu (JP); Maki Sato, Ohtsu (JP); Naoki Watanabe, Ohtsu (JP); Katsuhiko Kageyama, Ohtsu (JP); Mitsuyoshi Kuwata, Ohtsu (JP); Nobuo Moriyama, Ohtsu (JP); Haruo Matsumoto, Tsuruga (JP); Yoshitomo Ikehata, Tsuruga (JP); Yoshinao Matsui, Ohtsu (JP); Masaou Matsuda, Ohtsu (JP); Munekazu Okuhara, Iwakuni (JP); Hiroki Fukuda, Iwakuni (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 95 days.

This patent is subject to a terminal disclaimer.

(21) Appl. No.: 10/363,648

(22) PCT Filed: Sep. 10, 2001

(86) PCT No.: PCT/JP01/07855

§ 371 (c)(1),
(2), (4) Date: Aug. 19, 2003

(87) PCT Pub. No.: WO02/22707

PCT Pub. Date: Mar. 21, 2002

(65) Prior Publication Data

US 2004/0058805 A1    Mar. 25, 2004

(30) Foreign Application Priority Data

Sep. 12, 2000  (JP) .............................. 2000-276454
Oct. 13, 2000  (JP) .............................. 2000-312950

(51) Int. Cl.
    *B01J 31/00*  (2006.01)
(52) U.S. Cl. ............... 502/150; 502/152; 502/155; 502/162; 502/154; 528/272
(58) Field of Classification Search ................ 502/150, 502/152, 155, 162, 154; 528/272
See application file for complete search history.

(56) References Cited

U.S. PATENT DOCUMENTS

| 3,329,651 A | 7/1967 | Dobinson et al. |
| 3,528,945 A | 9/1970 | Price et al. |
| 3,528,946 A | 9/1970 | Price et al. |
| 3,533,973 A | 10/1970 | Price et al. |
| 3,574,174 A | 4/1971 | Bayer et al. |
| 3,575,174 A | 4/1971 | Bayer et al. |
| 3,594,347 A | 7/1971 | Lazarus et al. |
| 3,847,873 A | 11/1974 | Bayer et al. |
| 4,565,845 A | 1/1986 | Inoue et al. |
| 4,820,772 A * | 4/1989 | Goto et al. ................... 524/83 |
| 4,829,113 A * | 5/1989 | Rosenfeld ................... 524/128 |
| H000766 H * | 4/1990 | Yu ............................. 524/538 |
| 5,237,042 A | 8/1993 | Kim et al. |
| 5,260,246 A | 11/1993 | Yuo et al. |
| 5,272,035 A * | 12/1993 | Sekiya ....................... 430/157 |
| 5,326,831 A * | 7/1994 | Yezrielev et al. ........... 525/437 |
| 5,334,671 A * | 8/1994 | Yezrielev et al. ........... 525/443 |
| 5,391,700 A | 2/1995 | Itoh et al. |
| 5,399,607 A | 3/1995 | Nanbu et al |
| 5,512,340 A | 4/1996 | Goodley |
| 5,554,720 A | 9/1996 | Weaver et al. |
| 5,561,183 A | 10/1996 | Kwon et al. |
| 5,596,069 A | 1/1997 | Goodley |
| 5,639,825 A | 6/1997 | Nanbu et al. |
| 5,652,033 A | 7/1997 | Goodley |
| 5,674,801 A | 10/1997 | George |
| 5,693,786 A | 12/1997 | Tanaka et al. |
| 5,719,214 A | 2/1998 | Tanaka et al. |
| 5,733,969 A | 3/1998 | Thiele ........................ 524/791 |
| 5,744,572 A | 4/1998 | Schumann et al. |
| 5,770,682 A | 6/1998 | Ohara et al. |
| 5,782,935 A | 7/1998 | Hirt et al. |
| 5,847,011 A * | 12/1998 | Terado et al. ................. 521/48 |

(Continued)

FOREIGN PATENT DOCUMENTS

BE          641074         7/1965

(Continued)

OTHER PUBLICATIONS

Adding Value to Polymers, Ciba Specialty Chemicals K.K., Publ. No. J-99-001, 1999, pp. 4, 6, 8, and 12.

(Continued)

*Primary Examiner*—J. A. Lorengo
*Assistant Examiner*—Jennine Brown
(74) *Attorney, Agent, or Firm*—Kenyon & Kenyon LLP

(57) ABSTRACT

A polymerization catalyst for polyester production which contains neither a germanium compound nor an antimony compound as a major component. It contains aluminum as the main metallic ingredient, has excellent catalytic activity, and gives a polyester which is effectively inhibited from suffering thermal degradation, during melt molding, without deactivating or removing the catalyst, and is excellent in thermal stability, stability to thermal oxidation, and hydrolytic resistance. The polymerization catalyst contains as a first metallic ingredient at least one member selected among aluminum and compounds thereof and further contains a phosphorus compound represented by a specific chemical formula. The polyester produced with this catalyst is usable as fibers, films, sheets, various moldings including hollow moldings, etc.

25 Claims, No Drawings

U.S. PATENT DOCUMENTS

| | | | |
|---|---|---|---|
| 5,869,582 A * | 2/1999 | Tang et al. | 525/415 |
| 6,156,867 A | 12/2000 | Aoyama et al. | |
| 6,239,200 B1 | 5/2001 | Kao et al | |
| 6,362,358 B1 * | 3/2002 | Gronmaier et al. | 558/95 |
| 6,392,005 B1 | 5/2002 | Jen | |
| 6,451,959 B1 * | 9/2002 | Ohmatsuzawa et al. | 528/279 |
| 6,489,434 B1 | 12/2002 | Jen | |
| 6,589,324 B1 * | 7/2003 | Kamo et al. | 106/14.12 |

FOREIGN PATENT DOCUMENTS

| | | |
|---|---|---|
| CA | 2253515 | 10/1998 |
| CH | 495 395 | 8/1970 |
| CN | 1153185 A | 7/1997 |
| DE | 495395 | 8/1965 |
| EP | 0 419 669 A1 | 3/1991 |
| EP | 0 626 402 A2 | 5/1994 |
| EP | 0 626 402 A3 | 11/1994 |
| EP | 0 768 319 A1 | 4/1997 |
| EP | 0 909 775 A1 | 4/1999 |
| GB | 1348146 | 3/1974 |
| JP | 03 231918 | 10/1971 |
| JP | 46 5395 | 11/1971 |
| JP | 46-40711 | 12/1971 |
| JP | S46-040713(B) | 12/1971 |
| JP | S46-41031 | 12/1971 |
| JP | S49-32676 | 9/1974 |
| JP | 55 116722 | 9/1980 |
| JP | 60 035023 | 2/1985 |
| JP | 60 053532 | 3/1985 |
| JP | 61 101527 | 5/1986 |
| JP | 63-265951 | 11/1988 |
| JP | 02 666502 | 9/1991 |
| JP | 3-215522 | 9/1991 |
| JP | 4-3409 | 1/1992 |
| JP | 4-49846 | 8/1992 |
| JP | 4-49847 | 8/1992 |
| JP | 5-287064 | 11/1993 |
| JP | 06 279579 | 10/1994 |
| JP | 7-53691 | 2/1995 |
| JP | 08 073581 | 3/1996 |
| JP | 8 193127 | 7/1996 |
| JP | 8-301994 | 11/1996 |
| JP | 9-31308 | 2/1997 |
| JP | 9-151242 | 6/1997 |
| JP | 9-151243 | 6/1997 |
| JP | 9-151244 | 6/1997 |
| JP | 09 291141 | 11/1997 |
| JP | 10 036495 | 2/1998 |
| JP | 10-204156 | 8/1998 |
| JP | 10 251394 | 9/1998 |
| JP | 10 259296 | 9/1998 |
| JP | 10 324741 | 12/1998 |
| JP | 11-49852 | 2/1999 |
| JP | 11 228681 | 8/1999 |
| JP | 11 228682 | 8/1999 |
| JP | 2000 63504 | 2/2000 |
| JP | 2000 302854 | 10/2000 |
| JP | 2001-26639 | 1/2001 |
| JP | 2001-131274 | 5/2001 |
| JP | 2001 131276 | 5/2001 |
| JP | 2001 163964 | 6/2001 |
| JP | 2001 278970 | 10/2001 |
| JP | 2002-220453 | 8/2002 |
| JP | 2002-226568 | 8/2002 |
| WO | WO 96/11978 | 4/1996 |
| WO | WO 96/41828 | 12/1996 |
| WO | WO98/42769 | 10/1998 |
| WO | WO 99/28033 | 6/1999 |
| WO | WO00/24804 | 5/2000 |
| WO | WO 00/71252 A1 | 11/2000 |
| WO | WO 01/42335 A1 | 6/2001 |
| WO | WO 03/004547 A2 | 1/2003 |

OTHER PUBLICATIONS

"Experimental Results: 1. PET Polymerization Experiment using Aluminum Acetylacetonate/Lithium Acetate (0.014 mol-%/0.025 mol-%) as catalyst; 2. PET Polymerization Experiment using Aluminum Acetylacetonate/Lithium Acetate (0.014mol-%/0.1 mol-%) as catalyst," conducted by (Exp. 1, polymerization) M. Kuwata (according to direction of T. Nakajima), Sep. 9, 1999; (Exp. 1, measurement of TD) T. Nakajima, Oct. 26, 1999; (Exp. 2, polymerization) M. Kuwata (according to direction of T. Nakajima), Jun. 14, 2000; (Exp. 2, measurement of TD) T. Nakajima, Aug. 11, 2000.

The Specification and Claims of U.S. Appl. No. 09/830,223, filed Nov. 18, 2003.

The Specification and Claims of U.S. Appl. No. 10/049,438, filed May 30, 2002.

The Specification and Claims of U.S. Appl. No. 10/186,634, filed Jul. 2, 2002.

The Specification and Claims of U.S. Appl. No. 10/169,491, filed Jul. 3, 2002.

English translation of International Search Report of PCT/JP01/07855, mailed Dec. 11, 2001.

* cited by examiner

POLYMERIZATION CATALYST FOR POLYESTER, POLYESTER PRODUCED WITH THE SAME, AND PROCESS FOR PRODUCING POLYESTER

REFERENCE TO RELATED APPLICATION

This application is a national stage application of PCT/JP01/07855, filed on Sep. 10, 2001 and claiming priority of JP 2000-276454, filed on Sep. 12, 2000, and JP 2000-312950, filed Oct. 13, 2000, the contents of which are incorporated herein by reference.

TECHNICAL FIELD

This invention relates to a polymerization catalyst for polyester, polyester produced by using the same and a process for producing polyester, and in particular to a novel polyester polymerization catalyst not using a germanium or antimony compound as a major catalytic component, polyester produced by using the same and a process for producing polyester. This invention provides fibers, films, sheets and hollow molded articles comprising polyester produced by the novel polyester polymerization catalyst not using a germanium or antimony compound as a major catalytic component.

BACKGROUND ART

Polyesters represented by polyethylene terephthalate (PET), polybutylene terephthalate (PBT), polyethylene naphthalate (PEN) etc. are excellent in mechanical and chemical characteristics, and are used in various fields for example in fibers for clothing and industrial materials, films for packaging or for magnetic tapes, sheets, bottles such as hollow molded articles, casings for electrical or electronic parts, and other molded articles of engineering plastics, depending on the characteristics of each polyester.

As typical polyester, polyester comprising an aromatic dicarboxylic acid and an alkylene glycol as major constituent components, for example polyethylene terephthalate (PET), is industrially produced by esterification or transesterification of terephthalic acid or dimethyl terephthalate and ethylene glycol to produce bis(2-hydroxyethyl)terephthalate which is then subjected to polycondensation at high temperatures in vacuo in the presence of a catalyst.

As a conventional polyester polymerization catalyst used in polycondensation of polyester, antimony trioxide has been used widely. Antimony trioxide is an inexpensive and highly active catalyst, but when antimony trioxide is used as a major component, that is, when it is used in such an amount as to exhibit a practical rate of polymerization, an antimony metal is precipitated at the time of polycondensation to cause problems such as gray discoloration or formation of insoluble particles in polyester. For this reason, polyester absolutely free of antimony or excluding antimony as a major catalytic component is desired.

The above-described insoluble particles in polyester cause the following problems:
(1) In polyester for film, the antimony metal precipitated serves as insoluble particles in polyester, which causes not only contamination of an outlet during melt extrusion but also deficiency in the surface of film. Further, when the polyester with insoluble particles is used as a starting material of hollow molded articles, it is difficult to obtain hollow molded articles excellent in transparency.

(2) The insoluble particles in polyester for fibers serves as insoluble particles not only causing a reduction in the strength of fibers, but also deposits around spinnerets during spinning. In production of polyester fibers, a polyester polymerization catalyst not causing formation of insoluble particles is desired from the viewpoint of productivity.

As a method of solving the problem described above, an attempt had been made at preventing gray discoloration and formation of insoluble particles in PET while using antimony trioxide as a catalyst. In Japanese Patent No. 2666502, for example, formation of black insoluble particles in PET is prevented by using antimony trioxide, a bismuth compound and a selenium compound as a polycondensation catalyst. Further, JP-A 9-291141 describes that precipitation of an antimony metal is prevented when antimony trioxide containing sodium and iron oxides is used as a polycondensation catalyst. However, these polycondensation catalysts cannot achieve the object of reducing the content of antimony in polyester.

As a method of solving the problem of the antimony catalyst in uses requiring transparency of PET bottles etc., for example JP-A 6-279579 discloses a method of improving transparency by prescribing the proportion of antimony and phosphorus compounds used. However, it cannot be said that hollow molded articles made of polyester obtained by this method are sufficiently transparent.

Further, JP-A 10-36495 discloses a continuous process for producing polyester excellent in transparency, which comprises use of antimony trioxide, phosphoric acid and a sulfonic acid compound. However, polyester obtained by such a method has lower thermal stability, and there is the problem of a high content of acetaldehyde in the resultant hollow molded article.

Polycondensation catalysts substituted for antimony type catalysts such as antimony trioxide have also been examined, and titanium compounds such as tetraalkoxy titanate or tin compounds have previously been proposed, but there is a problem that polyester produced by using these compounds is easily thermally degraded during melt molding, and the polyester is significantly discolored.

In an attempt at solving the problem arising when such titanium compounds are used as the polycondensation catalyst, for example JP-A 55-116722 proposes a method of simultaneously using tetraalkoxy titanate in combination with a cobalt salt and a calcium salt. Further, JP-A 8-73581 proposes a method of using tetraalkoxy titanate in combination with a cobalt compound as the polycondensation catalyst and simultaneously using an optical brightener. By these techniques, PET discoloration occurring when tetraalkoxy titanate is used as the polycondensation catalyst can be reduced, but prevention of thermal decomposition of PET cannot be achieved.

In another attempt at preventing thermal degradation during melt molding of polyester polymerized in the presence of a titanium compound as the catalyst, for example JP-A 10-259296 describes a method of adding a phosphorus compound after polymerization of polyester in the presence of the titanium compound as the catalyst. However, effective mixing of the additive with the polymer after polymerization is technically difficult and leads to higher costs, so this prior art method is not practically used under the present circumstances.

A method of adding an alkali metal compound to an aluminum compound to form a polyester polymerization catalyst having a sufficient catalytic activity is also known. When such a known catalyst is used, polyester excellent in thermal stability can be obtained, but this known catalyst using an alkali metal compound in combination should be added in a larger amount in order to attain a practical catalytic activity, and as a result, insoluble particles attributable to the alkali metal compound are increased, there arises a problem that when the PET is used in fibers, the spinnability and physical properties of fibers are getting worse, and when the PET is used in films, the physical properties of the films are getting worse, and hydrolytic resistance are lowered.

As an non-antimony catalyst, having an excellent catalytic activity and giving polyester excellent in thermal stability and hydrolytic resistance, a germanium compound has been practically used, but this catalyst has a problem that it is very expensive and easily distilled away from the reaction system during polymerization, thus changing the concentration of the catalyst in the reaction system and making control of polymerization difficult, so use of the germanium component as a major catalytic component is problematic.

For preventing thermal degradation of polyester during melt molding, there is also a method of removing a catalyst from polyester. JP-A 10-251394 discloses a method of removing a catalyst from polyester wherein a polyester resin is brought into contact with an extractant as supercritical fluid in the presence of an acidic substance. However, the method of using such supercritical fluid is technically difficult and leads to higher costs for products, and is thus not preferable.

For the reasons described above, there is demand for a polymerization catalyst which comprises a metal component other than antimony and germanium as a major catalytic component, has an excellent catalytic activity and gives polyester hardly suffering thermal degradation during melt molding and excellent in thermal stability and hydrolytic resistance.

This invention provides a polyester polymerization catalyst which contains neither an antimony compound nor a germanium compound as a major catalytic component but contains aluminum as a major metal component, has an excellent catalytic activity, and without deactivating or removing the catalyst, gives polyester effectively inhibited from suffering thermal degradation during melt molding and excellent in thermal stability, thermo oxidative stability and hydrolytic resistance. Further, this invention provides polyester produced with the catalyst, which is excellent in thermal stability, thermo oxidative stability and hydrolytic resistance during melt molding of films, hollow molded articles such as bottles, and fibers and which is superior in quality level even if virgin resin is used or scraps generated during molding are reutilized, as well as a process for producing polyester by using the polyester polymerization catalyst. Another object of this invention is to provide fibers, films, sheets and hollow molded articles comprising the polyester produced with the novel polyester polymerization catalyst which contains neither a germanium compound nor an antimony compound as a major catalytic component.

DISCLOSURE OF INVENTION

The polyester polymerization catalyst of this invention is characterized by comprising at least one member selected from aluminum and aluminum compounds thereof as a first metal-containing component in the coexistence of at least one member selected from phosphorus compounds represented by formulae 1 and 2:

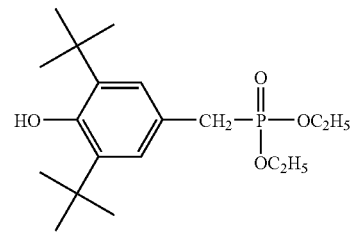

[formula 1]

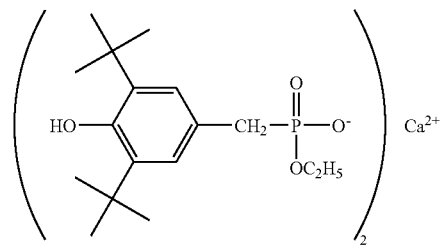

[formula 2]

By using the phosphorus compounds having these specific structures, there can be provided a polyester polymerization catalyst which contains neither an antimony compound nor a germanium compound as a major catalytic component but contains aluminum as a major metal component, has an excellent catalytic activity, and without deactivating or removing the catalyst, gives polyester effectively inhibited from suffering thermal degradation during melt molding and excellent in thermal stability and hydrolytic resistance.

Irganox 1222 and Irganox 1425 (Ciba Specialty Chemicals Inc.) are commercially available and usable respectively as the compounds represented by the formulae 1 and 2.

The phosphorus compounds as the catalyst component in this invention were known as antioxidants, but even if these phosphorous compounds are used in combination with conventional metal-containing polyester polymerization catalysts, their significant promotion of melt polymerization is not known. Even if the phosphorus compound in this invention is added actually for the melt polymerization of polyester by a typical polyester polymerization catalyst such as an antimony compound, titanium compound, tin compound or germanium compound, it cannot be recognized that the polymerization is promoted to substantially useful levels.

The amount of the phosphorus compound used in this invention is preferably 0.0001 to 0.1 mol-%, more preferably 0.005 to 0.05 mol-% relative to the number of moles of the whole constituent units of polycarboxylic acid components in the resulting polyester.

By simultaneously using the phosphorus compound in this invention, the resulting catalyst can exhibit a sufficient catalytic effect even if the amount of aluminum added to the polyester polymerization catalyst is small. When the amount of the phosphorus compound added is less than 0.0001 mol-%, the effect of the compound added may not be exhibited, while when the compound is added in an amount of higher than 0.1 mol-%, the catalytic activity of the polyester polymerization catalyst may be lowered, and this lowering tendency is varied depending on e.g. the amount of aluminum used.

There is a method of preventing discoloration resulting from a reduction in thermal stability in case a phosphorus compound is not used and an aluminum compound is used as a major catalyst component, the method comprising reducing the amount of the aluminum compound used and further adding a cobalt compound, but when the cobalt compound is added at a certain degree to achieve a sufficient catalytic activity, the thermal stability is lowered. Accordingly, this method hardly meets both prevention of discoloration and thermal stability.

By using the phosphorus compound having the above-described specific chemical structure according to this invention, there can be obtained a polyester polymerization catalyst which even if the amount of aluminum as the first metal-containing component is low, has a sufficient catalytic effect without causing problems such as a reduction in thermal stability, formation of insoluble particles etc., and this polyester polymerization catalyst can be used to solve thermal stability etc. of polyester films, hollow molded articles such as bottles, fibers, and engineering plastics during melt molding. Addition of phosphoric acid or a phosphate such as trimethyl phosphate in place of the phosphorus compound in this invention is not practical because there does not bring about any effect of the compound added. Further, even if the phosphorus compound in this invention is used in the amount defined in this invention in combination with a conventional metal-containing polyester polymerization catalyst such as antimony compound, titanium compound, tin compound or germanium compound, there does not bring about any effect of promoting the melt polycondensation reaction. Even if the phosphorus compound in this invention is used alone in the range of the amount defined in this invention, no catalytic activity is recognized.

Preferably, the polyethylene terephthalate (PET) polymerized by using the polyester polymerization catalyst of this invention satisfies both the relationship (1) below for thermal stability (TS) parameter as an indicator of polyester thermal stability, the relationship (2) below for hydrolytic stability (HS) parameter as an indicator of hydrolysis stability and the relationship (3) below for thermal oxidation stability (TOS) parameter.

$$TS < 0.3 \quad (1)$$

wherein TS is a numerical value calculated in the equation $TS=0.245\{[IV]_f^{-1.47}-[IV]_i^{-1.47}\}$, from the final intrinsic viscosity ($[IV]_f$) which is determined after 1 g melt-polymerized PET resin chips having an initial intrinsic viscosity ($[IV]_i$) of about 0.65 dl/g are placed in a glass test tube, vacuum-dried at 130° C. for 12 hours, and maintained in a molten state at 300° C. for 2 hours in a non-circulating nitrogen atmosphere. The non-circulating nitrogen atmosphere refers to a stationary nitrogen atmosphere in which a glass test tube containing e.g. resin chips is connected to a vacuum line and the replacement of the atmosphere by nitrogen is conducted five or more times by introducing nitrogen under reduced pressure, to achieve a nitrogen atmosphere at 100 Torr.

$$HS < 0.10 \quad (2)$$

wherein HS is a numerical value calculated in the equation $HS=0.245\{[IV]_{f2}^{-1.47}-[IV]_i^{-1.47}\}$, from the intrinsic viscosity ($[IV]_{f2}$) which is determined after melt-polymerized resin chips of PET having an initial IV ($[IV]_i$) of about 0.65 dl/g are frozen and milled to give powders of 20 meshes or less which are then vacuum-dried at 130° C. for 12 hours, and 1 g of the powders, together with 100 ml purified water, are placed in a beaker and then heated under stirring for 6 hours in a closed system at 130° C. under pressure.

The beaker used in measurement of HS is the one from which no acid or alkali is eluted. Specifically, use of a stainless steel beaker, a quartz beaker etc. is preferable.

$$TOS < 0.10 \quad (3)$$

wherein TOS is determined using the equation $TOS=0.245\{[IV]_{f3}^{-1.47}-[IV]_i^{-1.47}\}$, from the intrinsic viscosity ($[IV]_{f3}$) of PET which is determined after melt-polymerized resin chips of PET having an intrinsic viscosity ($[IV]_i$) of about 0.65 dl/g are frozen and milled to give powders of 20 meshes or less which are then vacuum-dried at 130° C. for 12 hours, and 0.3 g of the powders are placed in a glass test tube and vacuum-dried at 70° C. for 12 hours and then heated at 230° C. for 15 minutes in dry air over silica gel. The method of heating in dry air over silica gel can be, for example, a method wherein a glass test tube is heated in air dried by connecting a dry tube containing silica gel to an upper part of the test tube.

The PET resin chips used in measurement of TS, TOS and HS in this invention are prepared by rapid cooling of PET in a molten state obtained by usual melt-polymerization. The resin chips used in this measurement are, for example, those in the form of a cylinder of about 3 mm in length and about 2 mm in diameter. By use of the catalyst thus constituted, there can be obtained polyester giving molded articles excellent in melt thermal stability with less occurrence of discoloration and less formation of insoluble particles during heat melting in production of molded articles such as films, bottles and fibers. Also, there can be obtained polyester giving molded articles excellent in hydrolytic stability and thermo oxidative stability.

TS is more preferably 0.25 or less, still more preferably 0.20 or less. HS is more preferably 0.09 or less, still more preferably 0.085 or less. TOS is more preferably 0.09 or less, still more preferably 0.08 or less.

The catalyst of the invention is preferably free of alkali metals, alkaline earth metals or compounds thereof.

In a preferable embodiment of this invention, at least one member selected from alkali metals, alkaline earth metals and compounds thereof is allowed to be coexistent in a small amount as a second metal-containing component in addition to aluminum or a compound thereof. The second metal-containing component is allowed to be coexistent in the catalyst system in order to improve not only the effect of inhibiting formation of diethylene glycol but also the catalytic activity, thus providing a catalytic component for increasing the reaction rate to improve productivity effectively.

The technique of adding an alkali metal compound or an alkaline earth metal compound to an aluminum compound to form a catalyst having a sufficient catalytic activity is known. When such known catalyst is used, polyester excellent in thermal stability can be obtained, but the known catalyst using an alkali metal compound or an alkaline earth metal compound in combination with an aluminum compound should be added in a larger amount in order to achieve a practical catalytic activity, and use of the alkali metal compound causes a reduction in hydrolytic stability of the resulting polyester and an increase in the amount of insoluble particles attributable to the alkali metal, and use of the alkali metal compound in producing fibers causes a decrease in productivity and physical properties of the fiber, while use thereof for producing films causes a deterioration in film physical properties etc. When the alkaline earth metal compound is used in combination, a practical activity cannot be achieved without degrading the thermal stability of the resultant polyester, while discoloration occurs significantly upon heating, the amount of insoluble particles is increased, and hydrolytic stability is lowered.

When an alkali metal, an alkaline earth metal and compounds thereof are added, the amount M (mol-%) thereof is preferably in the range of $1\times10^{-6}$ to 0.1 mol-%, more preferably $5\times10^{-6}$ to 0.05 mol-%, still more preferably $1\times10^{-5}$ to 0.03 mol-%, further more preferably $1\times10^{-5}$ to 0.01 mol-%, relative to the number of moles of the whole polycarboxylic acid units constituting the polyester. The amount of the alkali metal and alkaline earth metal added is so small that the rate of reaction can be increased without causing problems such as a reduction in thermal stability, formation of insoluble particles, discoloration, a reduction in hydrolytic stability, etc. When the amount M of an alkali metal, an alkaline earth metal and compounds thereof is 0.1 mol-% or more, a reduction in thermal stability, formation of insoluble particles, an increase in discoloration and a reduction in hydrolytic stability can be problematic in manufacturing of products. When M is less than $1\times10^{-6}$ mol-%, the effect of the metal added is not evident.

BEST MODE FOR CARRYING OUT THE INVENTION

As aluminum or aluminum compounds constituting the polycondensation catalyst of this invention, it is possible to use not only metal aluminum but also known aluminum compounds without limitation.

Specifically, the aluminum compounds include carboxylates such as aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, aluminum tartrate and aluminum salicylate, inorganic acid salts such as aluminum chloride, aluminum hydroxide, aluminum hydroxide chloride, aluminum nitrate, aluminum sulfate, aluminum carbonate, aluminum phosphate and aluminum phosphonate, aluminum alkoxides such as aluminum methoxide, aluminum ethoxide, aluminum n-propoxide, aluminum iso-propoxide, aluminum n-butoxide and aluminum t-butoxide, aluminum chelate compounds such as aluminum acetylacetonate, aluminum acetylacetate, aluminum ethylacetoacetate, aluminum ethylacetoacetate di-iso-propoxide, organoaluminum compounds such as trimethyl aluminum and triethyl aluminum, and partial hydrolyzates thereof, a reaction product consisting of aluminum alkoxide or an aluminum chelate compound and hydroxycarboxylic acid, and composite oxides of aluminum oxide, superfine particles of aluminum oxide, aluminum silicate, aluminum, titanium, zirconium, alkali metal and alkaline earth metal. Among these, the carboxylates, inorganic acid salts and chelate compounds are preferable, among which aluminum acetate, aluminum lactate, aluminum chloride, aluminum hydroxide, aluminum hydroxide chloride and aluminum acetylacetonate are particularly preferable.

Among these aluminum compounds, those having higher aluminum contents, such as aluminum acetate, aluminum chloride, aluminum hydroxide and aluminum hydroxide chloride, are preferable, and from the viewpoint of solubility, aluminum acetate, aluminum chloride and aluminum hydroxide chloride are preferable. Further, use of aluminum acetate is particularly preferable from the viewpoint of no corrosion of units.

The term "aluminum hydroxide chloride" is a generic name of those compounds also called polyaluminum chloride and basic aluminum chloride, and those for use in tap water can be used. These are represented for example by the general structural formula $[Al_2(OH)_nCl_{6-n}]_m$ ($1 \leq n \leq 5$). Among these, those having low chlorine contents are preferable from the viewpoint of no corrosion of units.

The term "aluminum acetate" is a generic name of those compounds having an aluminum acetate salt structure, represented by basic aluminum acetate, aluminum triacetate and aluminum acetate solutions, among which basic aluminum acetate is used preferably from the viewpoint of solubility and stability of the solution. Among the basic aluminum acetate, aluminum monoacetate, aluminum diacetate and their stabilized compounds with boric acid are preferable. When the basic aluminum acetate stabilized with boric acid is used, the basic aluminum acetate stabilized with equimolar or less boric acid is preferably used, and particularly the basic aluminum acetate stabilized with ½ to ⅓ molar boric acid is preferably used. The stabilizer for basic aluminum acetate includes not only boric acid but also urea and thiourea etc. The above-described basic aluminum acetate made solubilized in a solvent such as water or glycol, particularly the one made solubilized in water and/or ethylene glycol is used preferably from the viewpoint of catalytic activity and qualities of the resulting polyester.

Hereinafter, the method of preparing a solution of basic aluminum acetate is specifically described.

(1) Preparation of an Aqueous Solution of Basic Aluminum Acetate

Water is added to basic aluminum acetate and stirred at room temperature for several hours or more. The stirring time is preferably 12 hours or more. Thereafter, stirring is carried out at 60° C. or more for several hours or more. The temperature in this case is preferably in the range of 60 to 80° C. The stirring time is preferably 3 hours or more. The concentration of the aqueous solution is preferably 10 g/l to 30 g/l, particularly preferably 15 g/l to 20 g/l.

(2) Preparation of a Solution of Basic Aluminum Acetate in Ethylene Glycol

Ethylene glycol is added to the above aqueous solution. Ethylene glycol is added in a volume ratio of preferably 1-5, more preferably 2-3, to the aqueous solution. The solution is stirred for several hours at ordinary temperatures, whereby a uniform mixed solution in water/ethylene glycol is obtained. Thereafter, the solution is heated to distill water away, to give an ethylene glycol solution. The temperature is preferably 80 to 120° C. The temperature is more preferably 90 to 110° C. at which the solution is stirred preferably for several hours to distill water away.

As the aluminum lactate, the one made solubilized in a solvent such as water or glycol, particularly the one made solubilized in water and/or ethylene glycol is used preferably from the viewpoint of catalytic activity and qualities of the resulting polyester.

Hereinafter, the method of preparing a solution of aluminum lactate in ethylene glycol is specifically described.

An aqueous solution of aluminum lactate is prepared. This preparation may be carried at room temperature or under heating, preferably at room temperature. The concentration of the aqueous solution is 20 g/l to 100 g/l, more preferably 50 to 80 g/l. Ethylene glycol is added to the aqueous solution.

Ethylene glycol is added in a volume ratio of preferably 1-5, more preferably 2-3, to the aqueous solution. The solution is stirred at ordinary temperatures to give a uniform mixed solution in water/ethylene glycol, and then the solution is heated to distill water away, to give an ethylene glycol solution. The temperature is preferably 80 to 120° C. The temperature is more preferably 90 to 110° C. at which the solution is stirred preferably for several hours to distill water away.

The amount of aluminum or the aluminum compound used in this invention is preferably 0.001 to 0.05 mol-%, more preferably 0.005 to 0.02 mol-%, relative to the number of moles of the whole constituent units of carboxylic acid components such as dicarboxylic acids and polyvalent carboxylic acids in the resultant polyester. When the amount thereof is less than 0.001 mol-%, the catalytic activity may not be sufficiently exhibited, while when the amount is higher than 0.05 mol-%, a reduction in thermal stability and thermal oxidation stability and formation of insoluble particles and discoloration attributable to aluminum may be problematic. Thus, a distinctive feature of the polycondensation catalyst of the invention is that the catalyst exhibits a significant catalytic activity even in a small amount of the aluminum component added. As a result, the resulting polyester is excellent in thermal stability and thermal oxidation stability with less insoluble particles and discoloration attributable to aluminum.

The alkali metal or alkaline earth metal constituting the second metal-containing component which is used preferably in combination with aluminum or the compound thereof in this invention is preferably at least one member selected from Li, Na, K, Rb, Cs, Be, Mg, Ca, Sr and Ba, among which at least one member selected from Li, Na, Mg and compounds thereof is used more preferably. The alkali metal or alkaline earth metal compounds include salts of these metals, for example saturated aliphatic carboxylates such as formate, acetate, propionate, butyrate and oxalate, unsaturated aliphatic carboxylates such as acrylate and methacrylate, aromatic carboxylates such as benzoate, halogen-containing carboxylates such as trichloroacetate, hydroxy carboxylates such as lactate, citrate and salicylate, inorganic acid salts such as carbonate, sulfate, nitrate, phosphate, phosphonate, hydrogen carbonate, hydrogen phosphate, hydrogen sulfide, sulfite, thiosulfate, hydrochloride, hydrobromate, chlorate and bromate, organic sulfonates such as 1-propane sulfonate, 1-pentane sulfonate and naphthalene sulfonate, organic sulfates such as lauryl sulfate, alkoxides such as methoxy, ethoxy, n-propoxy, iso-propoxy, n-butoxy and tert-butoxy, chelate compounds such as acetylacetonate, hydrides, oxides and hydroxides.

When highly alkaline compounds such as hydroxides among these alkali metals, alkaline earth metals or compounds thereof are used, they tend to be hardly dissolved in organic solvents, for example diols such as ethylene glycol or alcohols, so they should be added as an aqueous solution to the polymerization system, which may be problematic in the polymerization process. Further, when highly alkaline compounds such as hydroxides are used, the polyester easily undergoes side reactions such as hydrolysis during polymerization, while the polymerized polyester is easily discolored, and hydrolytic stability also tends to be lowered. Accordingly, preferable examples of the alkali metals or compounds thereof or alkaline earth metals or compounds thereof in this invention are alkali metal salts or alkaline earth metal salts selected from saturated aliphatic carboxylate, unsaturated aliphatic carboxylate, aromatic carboxylate, halogen-containing carboxylate, hydroxy carboxylate, sulfate, nitrate, phosphate, phosphonate, hydrogen phosphate, hydrogen sulfide, sulfite, thiosulfate, hydrochloride, hydrobromate, chlorate and bromate, as well as other inorganic acid salts, organic sulfonates, organic sulfates, chelate compounds and oxides. Among these, alkaline metal or alkaline earth metal saturated aliphatic carboxylates particularly acetates are preferably used from the viewpoint of easy handling and easy availability.

In a preferable embodiment, a cobalt compound is further added in an amount of less than 10 ppm in terms of cobalt atom to the polyester of this invention. The amount is more preferably 5 ppm or less, still more preferably 3 ppm or less.

It is known that the cobalt compound itself has a polymerization activity at a certain degree, but when it is added in such an amount as to exhibit a sufficient catalytic effect, the thermal stability of the resultant polyester is lowered as described above. The polyester obtained according to this invention is excellent in thermal stability, and by adding the cobalt compound in such a small amount that the catalytic effect thereof is not evident, the discoloration of the resultant polyester can be effectively diminished. The object of the cobalt compound in this invention is to diminish discoloration, and the cobalt compound may be added at any stage of polymerization or after polymerization reaction, or at any stage between polymerization reaction and molding.

The cobalt compound is not particularly limited, and specific examples thereof include cobalt acetate, cobalt nitrate, cobalt chloride, cobalt acetyl acetonate and cobalt naphthenate or hydrates thereof. Among these, cobalt acetate.4H$_2$O is particularly preferable.

In another preferable embodiment, color tone improvers other than the cobalt compound are used to improve the color tone of the polyester of the invention. The color tone improvers refer to those materials which upon addition, change the color tone. The color tone improvers in this invention are not particularly limited, but inorganic and organic pigments, dyes and optical brighteners are preferable.

When pigments or dyes are used, there arises a problem that when their amount is increased, the brightness of the polymer is lowered. Accordingly, there arises a problem that the polymer becomes unacceptable in many uses. Accordingly, the total amount of the pigments and dyes used is preferably 20 ppm or less, more preferably 10 ppm or less, still more preferably 5 ppm or less, relative to the resulting polyester. In this range, discoloration can be effectively prevented without lowering the brightness of the polymer.

Further, use of the optical brightener singly or in combination with another color tone improver is preferable because the color tone is improved so that for example the amount of the pigment or dye used can be reduced. As the optical brightener, those conventionally used may be used alone or as a mixture thereof. The amount thereof is preferably 50 ppm or less, more preferably 5 to 25 ppm, relative to the resulting polyester.

The inorganic pigment in the invention is not particularly limited insofar as the color tone can be changed, and examples thereof include titanium dioxide, carbon black, black iron oxide, nickel titanium yellow, yellow oxide, cadmium yellow, chrome yellow, chrome titanium yellow, zinc ferrite pigment, red oxide, cadmium red, molybdenum red, chrome oxide, spinel green, chrome orange, cadmium orange, ultramarine, Prussian blue, cobalt blue etc. Among these, chrome oxide, ultramarine, Prussian blue and cobalt blue are preferable, and ultramarine and cobalt blue are more preferable. These inorganic pigments may be used alone or as a mixture of two or more thereof as necessary.

The organic pigments and dyes in this invention are not limited insofar as their color tone can be changed, and examples thereof are those indicated by color index, such as Pigment Red 5, 22, 23, 31, 38, 48:1, 48:2, 48:3, 48:4, 52, 53:1, 57:1, 122, 123, 144, 146, 151, 166, 170, 177, 178, 179, 187, 202, 207, 209, 213, 214, 220, 221, 247, 254, 255, 263, 272, Pigment Orange 13, 16, 31, 36, 43, 61, 64, 71, Pigment Brown 23, Pigment Yellow 1, 3, 12, 13, 14, 17, 55, 73, 74, 81, 83, 93, 94, 95, 97, 109, 110, 128, 130, 133, 136, 138, 147, 150, 151, 154, 180, 181, 183, 190, 191, 191:1, 199, Pigment Green 7, 36, Pigment Blue 15, 15:1, 15:2, 15:3, 15.4, 15:6, 29, 60, 64, 68, Pigment Violet 19, 23, 37, 44, Solvent Red 52, 117, 135, 169, 176, Disperse Red 5, Solvent Orange 63, 67, 68, 72, 78, Solvent Yellow 98, 103, 105, 113, 116, Diverse Yellow 54, 64, 160, Solvent Green 3, 20, 26, Solvent Blue 35, 45, 78, 90, 94, 95, 104, 122, 132, Solvent Violet 31, etc. In addition, other dyes/pigments based on anthraquinone, phthalocyanine, quinacridone, isoindoline, dioxazine, quinophthalone, perylene, perynone, benzimidazolone, diarylide, vat, indigo, quinophthalone, diketopyrrolopyrrole and anthrapyrrolidone can be mentioned.

Among these, Pigment Red 187, 263, Pigment Blue 15:1, 15:3, 29, 60, Pigment Violet 19, Solvent Red 135, Solvent Blue 45, 90, 104, 122 and anthraquinone- and phthalocyanine-based dyes/pigments are particularly preferable.

The pigment and/or dye selected are preferably those satisfying the following conditions: First, the pigment and dye should be not extractable from the polymer in order to bring about the maximum safety. They should be stable to sunrays and to temperature and humid conditions in a wide range. Sublimation or color tone change should not occur at very high temperatures in production of the polyester. Further, the pigment and dye are preferably those not adversely affecting the physical properties of the polyester polymer.

The pigment and/or dye is not particularly limited insofar as they satisfy these conditions and improve the color tone of the polyester, and for example, color tone improvers using blue 1,4-bis(2,6-dialkylanilino)anthraquinone as a main component in combination with red anthraquinone and anthrapyridone (3H-dibenzo[fi,j]isoquinoline-2,7-dione) depending on color tone, etc. are exemplified in Japanese Patent Application National Publication (Laid-Open) No. 2000-511211, and these can be used. These dyes have suitable color characteristics, are stable to heat, light, humidity and various environmental factors, can be incorporated into a polyester polymer structure during polymerization, and solve many problems of known organic dyes. Further, they are stable to UV rays, high temperatures, glycolysis and hydrolysis. The amounts of the blue and red components can be changed as necessary to effectively work for polyester having different degrees of coloration.

As the optical brightener in this invention, those used generally may be used alone or in combination thereof. For example, benzoxazoline-based optical brighteners, preferably UVITEX OB, UVITEX OB-P and UVITEX OB-ONE manufactured by Ciba Specialty Chemicals, HOSTALUX KS manufactured by Clariant, and those described in JP-A 10-1563 can be exemplified and preferably used.

The color tone improvers of different types can be combined in an arbitrary ratio in order to achieve achromatic color tone. Further, the color tone improver may be added at any polymerization stages or after polymerization reaction or any stages between polymerization reaction and molding. When added during polymerization, the color tone improver is added preferably in a powdery form or as a mixture thereof dissolved in one polyester monomer. When added after polymerization reaction, the color tone improver is added preferably as powder or a master batch.

When there is a problem in dispersibility of pigments etc., it may be preferable to use a dispersant as necessary. The dispersant is not particularly limited insofar as it facilitates dispersion of the pigment, and examples thereof include N,N'-alkylene-bis-fatty acid amides such as N,N'-ethylene-bis-myristic acid amide, N,N'-ethylene-bis-stearic acid amide, N,N'-ethylene-bis-oleic acid amide, N,N'-methylene-bis-myristic acid amide, N,N'-methylene-bis-stearic acid amide, N,N'-methylene-bis-oleic acid amide, etc. Among these, N,N'-methylene-bis-stearic acid amide is preferable. The amount of the dispersant added is varied depending on performance, but the dispersant may be added in an amount of 10 to 200 wt-%, preferably 40 to 150 wt-%, relative to the pigment.

Production of polyester according to the present invention can be carried out in the same manner as in the conventional process except that the polyester polymerization catalyst of this invention is used as the catalyst. For example, PET is produced by a direct esterification method wherein terephthalic acid and ethylene glycol and if necessary other copolymerizable components are directly reacted to form an ester while water is distilled away, followed by polycondensation under reduced pressure or by a transesterification method wherein dimethyl terephthalate and ethylene glycol and if necessary other copolymerizable components are reacted for transesterification while methyl alcohol is distilled away, followed by polycondensation under reduced pressure. If necessary, solid state polymerization may also be conducted in order to increase the intrinsic viscosity. For promotion of crystallization before solid state polymerization, melt-polymerized polyester is allowed to absorb water vapor and then crystallized by heating, or polyester chips are sprayed directly with water vapor and then crystallized by heating.

The melt polycondensation reaction may be conducted in a reaction unit in a batch system or a reaction unit in a continuous system. In either system, the esterification reaction or transesterification reaction may be conducted at one stage or divided stages. The melt polycondensation reaction may also be conducted at one stage or divided stages. The solid state polymerization reaction, similar to the melt polycondensation reaction, can be conducted in a reaction unit in a batch system or a reaction unit in a continuous system. The melt polycondensation and solid state polymerization can be conducted continuously or successively. The process for producing polyethylene terephthalate in a continuous system is described in detail below by reference to a preferable embodiment.

First, production of a low polymer by esterification reaction is described. Slurry containing 1.02 to 1.5 moles, preferably 1.03 to 1.4 moles of ethylene glycol per mole of terephthalic acid or an ester derivative thereof is prepared and fed continuously to the esterification reaction process.

The esterification reaction is conducted with ethylene glycol refluxed in a multistage unit consisting of 1 to 3 esterification reactors connected in series, during which water or alcohol formed by the reaction is discharged from the reaction system through a distillation column. The temperature in the esterification reaction at the first stage is 240 to 270° C., preferably 245 to 265° C., the pressure is 0.2 to 3 kg/cm$^2$G (0.02 to 0.3 Mpa·G, that is, under a pressure of 0.02 to 0.3 MPa=atmospheric pressure+0.02 to 0.3 MPa), preferably 0.5 to 2 kg/cm$^2$G. The temperature in the esterification reaction at the final stage is usually 250 to 290° C., preferably 255 to 275° C., and the pressure is usually 0 to 1.5 kg/cm$^2$G, preferably 0 to 1.3 kg/cm$^2$G. When the reaction is conducted at three or more stages, the esterification reaction conditions for intermediate stages are intermediate conditions between the conditions at the first stage and final stage. The degree of the esterification reaction is preferably evenly increased at the respective stages. Desirably, the degree of esterification finally attains 90% or more, preferably 93% or more. By these esterification reactions, low-condensed products of molecular weights of about 500 to 5000 can be obtained.

When terephthalic acid is used as the starting material, the esterification reaction can be conducted in the absence of a catalyst because terephthalic acid has a catalytic activity as the acid, but the reaction may also be conducted in the coexistence of a polymerization catalyst.

Because the ratio of dioxyethylene terephthalate units in a major chain of polyethylene terephthalate can be kept at a low level (5 mol-% or less relative to the whole total diol components), the reaction is carried out preferably in the presence of a small amount of tertiary amines such as triethylamine, tri-n-butylamine and benzyl dimethylamine, quaternary ammonium hydroxides such as tetraethyl ammonium hydroxide, tetra-n-butyl ammonium hydroxide and trimethyl benzyl ammonium hydroxide, and basic compounds such as lithium carbonate, sodium carbonate, potassium carbonate and sodium acetate.

When oligomer is produced by transesterification reaction, a solution containing ethylene glycol in an amount of 1.1 to 1.6 moles, preferably 1.2 to 1.5 moles per mole of dimethyl terephthalate is prepared and fed continuously to the transesterification reaction process.

The transesterification reaction is conducted with ethylene glycol refluxed in a multistage unit consisting of 1 or 2 esterification reactors connected in series, during which methanol formed by the reaction is discharged from the reaction system through a distillation column. The temperature of the transesterification reaction at the first stage is 180 to 250° C., preferably 200 to 240° C. The temperature of the transesterification reaction at the final stage is usually 230 to 270° C., preferably 240 to 265° C., and Zn, Cd, Mg, Mn, Co, Ca and Ba fatty acid salts and carboxylic acid salts, and Pb, Zn, Sb and Ge oxides are used as the transesterification catalyst. Low-condensed products with molecular weights of about 200 to 500 are obtained by these transesterification reactions.

Then, the resultant low-condensed products are fed to a multistage liquid phase polycondensation process. The polycondensation reaction conditions are selected such that the temperature for the polycondensation reaction at the first reaction stage is 250 to 290° C., preferably 260 to 280° C., the pressure is 500 to 20 Torr, preferably 200 to 30 Torr, and the temperature for the polycondensation reaction at the final stage is 265 to 300° C., preferably 275 to 295° C., and the pressure is 10 to 0.1 Torr, preferably 5 to 0.5 Torr. When the reaction is carried out at three or more stages, the reaction conditions for the polycondensation reaction at intermediate stages are intermediate conditions between the reaction conditions at the first stage and final stage. Preferably, the increase in the intrinsic viscosity is achieved evenly at the respective polycondensation reaction stages.

When a low content of acetaldehyde or a low content of cyclic trimers in e.g. low-flavor drinks or heat-resistant hollow molded products for mineral water is required, the melt-polycondensed polyester thus obtained is subjected to solid state polymerization. The polyester is subjected to solid state polymerization in a method known in the art. First, the polyester to be subjected to solid state polymerization is preliminarily crystallized by heating at a temperature of 100 to 210° C. for 1 to 5 hours in an inert gas or under reduced pressure or in water vapor or in an atmosphere of inert gas containing water vapor. Then, solid state polymerization is carried out at a temperature of 190 to 230° C. for 1 to 30 hours in an inert gas atmosphere or under reduced pressure.

The method of reducing the content of cyclic trimers is not limited to solid state polymerization. For example, a method of deactivating the catalyst with hot water etc. or a method of heat treatment in an inert gas known in the art may be used. The heat treatment method known in the art includes those methods described in e.g. JP-A 2-298512, JP-A 8-120062 etc.

The temperature for the heat treatment is a temperature of from 180° C. to the melting point of the polyester. The temperature for ordinary polyethylene terephthalate is preferably 190 to 260° C., particularly preferably 200 to 250° C.

The time for the heat treatment is preferably 2 hours or more. Usually, the treatment time is preferably 2 to 60 hours, more preferably 2 to 40 hours.

The content of water vapor in the atmosphere for the heat treatment is preferably 1000 ppm or less, more preferably 500 ppm or less, still more preferably 400 ppm or less. The oxygen concentration is preferably 1000 ppm or less, more preferably 500 ppm or less, still more preferably 100 ppm or less, most preferably 50 ppm or less.

The inert gas used is preferably a gas inert to the polyester obtained in this invention, and examples thereof include a nitrogen gas, carbon dioxide gas, helium gas etc. In particular, a nitrogen gas is inexpensive and thus preferable.

As a condition for the heat treatment, either a non-circulating inert gas atmosphere or an atmosphere with a circulating inert gas stream can be selected as an inert gas atmosphere.

When heat treatment is carried out in a substantially non-circulating inert gas, the polyester is heat-treated in a heat-treatment chamber under slightly pressurized conditions with the inert gas described above. When heat treatment is carried out in a substantially circulating inert gas stream, heat treatment is carried out usually at normal pressure, but may be carried out under pressurized conditions of not higher than 5 kg/cm$^2$. In this case, the glycol component used in production of the polyester of this invention is preferably contained in the atmosphere. On the other hand, the flow rate of the inert gas is related closely to the intrinsic viscosity of the polyester, so the flow rate should be determined suitably depending on the concentration of glycol contained, the intrinsic viscosity of desired polyester and heat treatment temperature.

The unit for heat treatment is desirably an unit wherein the polyester can be uniformly contacted with the inert gas. Such heat treatment units include, for example, a stationary dryer, a rotary dryer, a fluidized bed dryer, a dryer having a stirring blade, and a glass test tube.

The catalyst of this invention has a catalytic activity not only in polycondensation reaction but also in esterification reaction and transesterification reaction. For example, polymerization by transesterification reaction between an alkyl dicarboxylate such as dimethyl terephthalate and a glycol such as ethylene glycol is conducted usually in the presence of a transesterification catalyst such as a titanium compound or a zinc compound, but the catalyst of this invention can also be used in place of such catalyst or in the coexistence of such catalyst. Further, the catalyst of this invention also has a catalytic activity not only in melt polymerization but also in solid state polymerization and solution polymerization, and in any methods, polyester can be produced.

The polycondensation catalyst of this invention can be added to the reaction system at an arbitrary stage of the polymerization reaction. For example, the catalyst can be added to the reaction system before or during esterification reaction or transesterification reaction or just before or during polycondensation reaction. In particular, aluminum or a compound thereof is added preferably just before polycondensation reaction.

The method of adding the polycondensation catalyst of this invention is not particularly limited, and the catalyst may be added in a powdery or neat state or in the form of a solution or slurry in a solvent such as ethylene glycol. Alternatively, an aluminum metal or a compound thereof and another component preferably the phosphorus compound in this invention may be added as a mixture, or these components may be added separately. Alternatively, an aluminum metal or a compound thereof and another component preferably the phosphorus compound may be added simultaneously to the polymerization system, or these components may be added separately at different stages. Further, the catalyst may be added in one portion or in divided portions.

When a mixture of the aluminum compound and the phosphorus compound constituting the polycondensation catalyst of the invention is used as the catalyst, the phosphorus compound in this invention may be added to a previously prepared solution of the aluminum compound, or the aluminum compound may be added to a previously prepared solution of the phosphorus compound, in order to prepare the catalyst. Alternatively, solutions of the two components may be mixed or the two may be dissolved simultaneously in a solvent. As the solvent, glycols such as ethylene glycol, water or other solvents can be used, but water and/or ethylene glycol is preferably used. The solution may be prepared at ordinary temperatures or under heating. The catalyst may be used not only as a solution but also as slurry containing the two components or a mixture containing the two in a powdery form.

To improve productivity by shortening the polymerization time, it is effective and preferable that the polycondensation catalyst of this invention is used in the coexistence of another polycondensation catalyst such as an antimony compound, a germanium compound or a titanium compound in such an amount as not to cause the above problems in the properties, processability and color tone of polyester.

The antimony compound is added preferably in an amount of 50 ppm or less in terms of antimony atom relative to the polyester obtained by polymerization. The antimony compound is added more preferably in an amount of 30 ppm or less. An amount of antimony greater than 50 ppm is not preferable because an antimony metal is precipitated to cause gray discoloration or to form insoluble particles in the polyester.

The germanium compound is added preferably in an amount of 20 ppm or less in terms of germanium atom relative to the polyester obtained by polymerization. The germanium compound is added more preferably in an amount of 10 ppm or less. An amount of germanium greater than 20 ppm is economically disadvantageous and thus not preferable.

The titanium compound is added preferably in the range of 5 ppm or less in terms of titanium atom relative to the polymer obtained by polymerization. The titanium compound is added more preferably in an amount of preferably 3 ppm or less, still more preferably 1 ppm or less. It is not desirable that titanium is added in an amount of higher than 5 ppm, because the discoloration of the resultant resin is significant and the thermal stability is significantly degraded.

The antimony compound usable in this invention is not particularly limited, and preferable compounds include antimony trioxide, antimony pentaoxide, antimony acetate, antimony glucoxide etc., among which antimony trioxide is preferably used. The germanium compound includes, but is not limited, to germanium dioxide, germanium tetrachloride etc., among which germanium dioxide is preferable. Germanium dioxide used may be crystalline or amorphous.

The titanium compound usable in this invention includes, but is not limited, tetra-n-propyl titanate, tetra-isopropyl titanate, tetra-n-butyl titanate, tetra-isobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, composite oxides of titanium and silicon or zirconium and an alkali metal or alkaline earth metal, an ortho-ester or condensed ortho-ester of titanium, a reaction product consisting of an ortho-ester or condensed ortho-ester of titanium and a hydroxycarboxylic acid, a reaction product consisting of an ortho-ester or condensed ortho-ester of titanium, a hydroxycarboxylic acid and a phosphorus compound, a polyvalent alcohol having an ortho-ester or condensed ortho-ester of titanium and at least 2 hydroxyl groups, and a reaction product consisting of 2-hydroxycarboxylic acid and a base, among which a composite oxide of titanium and silicon, a composite oxide of titanium and magnesium, and a reaction product consisting of an ortho-ester or condensed ortho-ester of titanium, a hydroxycarboxylic acid and a phosphorus compound are preferable.

The tin compound includes dibutyltin oxide, methylphenyltin oxide, tetraethyl tin, hexaethylditin oxide, triethyltin hydroxide, monobutyl hydroxytin oxide, triisobutyltin acetate, diphenyltin dilaurate, monobutyltin trichloride, dibutyltin sulfide, dibutyl hydroxytin oxide, methylstannic acid, ethyl stannate etc., among which monobutyl hydroxytin oxide is preferably used.

The polyester in this invention refers to polyester comprising one or more members selected from polyvalent carboxylic acids including dicarboxylic acids and ester-forming derivatives thereof and one or more members selected from polyvalent alcohols including glycols, to polyester comprising one or more members selected form hydroxycarboxylic acids and ester-forming derivatives thereof, or to polyester comprising cyclic esters.

The dicarboxylic acids include saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimer acid or ester-forming derivatives thereof, unsaturated aliphatic dicarboxylic acids such as fumaric acid, maleic acid and itaconic acid or ester-forming derivatives thereof, and aromatic dicarboxylic acids such as orthophthalic acid, isophthalic acid, terephthalic acid, diphenine acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyl dicarboxylic acid, 4,4'-biphenyl sulfone dicarboxylic acid, 4,4'-biphenyl ether dicarboxylic acid, 1,2'-bis(phenoxy)ethane-p,p'-dicarboxylic acid, pamoinic acid and anthracene dicarboxylic acid or ester-forming derivatives thereof.

Among these dicarboxylic acids, terephthalic acid, isophthalic acid and naphthalene dicarboxylic acid are particularly preferably used for the physical properties of the resultant polyester, and if necessary other dicarboxylic acids are used as constituent components.

The polyvalent carboxylic acids other than these dicarboxylic acids include ethane tricarboxylic acid, propane tricarboxylic acid, butane tetracarboxylic acid, pyromellitic acid, trimellitic acid, trimesic acid, 3,4,3',4'-biphenyl tetracarboxylic acid and ester-forming derivatives thereof.

The glycols include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cylohexane diol, 1,3-cylohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol, polyethylene glycol, polytrimethylene glycol and polytetramethylene glycol, and aromatic glycols such as hydroquinone, 4,4-dihydroxybisphenol, 1,4-bis(β-hydroxyethoxy)benzene, 1,4-bis(β-hydroxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalene diol, and glycols having ethylene oxide added to these glycols.

Among these glycols, ethylene glycol, 1,3-propylene glycol, 1,4-butylene glycol and 1,4-cyclohexane dimethanol are particularly preferably used as major components.

The polyvalent alcohols other than these glycols include trimethylol methane, trimethylol ethane, trimethylol propane, pentaerythritol, glycerol, and hexane triol.

The hydroxycarboxylic acids include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexane carboxylic acid or ester-forming derivatives thereof.

The cyclic esters include ε-caprolactone, β-propiolactone, β-methyl-β-propiolactone, δ-valerolactone, glycolide and lactide.

The ester-forming derivatives of polyvalent carboxylic acids or hydroxycarboxylic acids include alkyl esters, acid chlorides and acid anhydrides thereof.

The polyester used in this invention is polyester whose major acid component is terephthalic acid or an ester-forming derivative thereof or naphthalene dicarboxylic acid or an ester-forming derivative thereof, preferably polyester whose major glycol component is an alkylene glycol.

The polyester whose major acid component is terephthalic acid or an ester-forming derivative thereof is polyester wherein the total content of terephthalic acid or an ester-forming derivative is preferably 70 mol-% or more, more preferably 80 mol-% or more and most preferably 90 mol-% or more, relative to the whole acid components. The polyester whose major acid component is naphthalene dicarboxylic acid or an ester-forming derivative thereof is polyester wherein the total content of naphthalene dicarboxylic acid or an ester-forming derivative is preferably 70 mol-% or more, more preferably 80 mol-% or more and most preferably 90 mol-% or more, relative to the whole acid components.

The polyester whose major glycol component is an alkylene glycol is polyester wherein the total content of the alkylene glycol is preferably 70 mol-% or more, more preferably 80 mol-% or more and most preferably 90 mol-% or more, relative to the whole glycol components. As used herein, the alkylene glycol may contain a substituent group or an alicyclic structure in the molecule chain thereof.

The naphthalene dicarboxylic acid or ester-forming derivatives thereof used in this invention are preferably those exemplified above as the dicarboxylic acids, that is, 1,3-naphthalene dicarboxylic acid, 1,4-naphthalene dicarboxylic acid, 1,5-naphthalene dicarboxylic acid, 2,6-naphthalene dicarboxylic acid or 2,7-naphthalene dicarboxylic acid, or ester-forming derivatives thereof.

As the alkylene glycol used in the invention, it is preferable to use those exemplified above as glycols, that is, ethylene glycol, 1,2-propylene glycol, 1,3-propylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cyclohexane diol, 1,3-cyclohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol etc. Two or more of these compounds may be simultaneously used.

The polyester of this invention include polyethylene terephthalate, polybutylene terephthalate, polypropylene terephthalate, poly(1,4-cyclohexane dimethylene terephthalate), polyethylene naphthalate, polybutylene naphthalate, polypropylene naphthalate and copolymers thereof, among which polyethylene terephthalate and copolymers thereof are particularly preferable.

The polyester of this invention can also contain a known phosphorus compound as a copolymerizable component. The phosphorus compound is preferably a bifunctional phosphorus type compound such as, for example, (2-carboxyethyl)methylphosphinic acid, (2-carboxyethyl)phenylphosphinic acid, and 9,10-dihydro-10-oxa-(2,3-carboxypropyl)-10-phosphaphenanthrene-10-oxide. These phosphorus type compounds can be contained as copolymerizable components to improve e.g. the flame retardancy of the resultant polyester.

In a preferable embodiment, polycarboxylic acids having an alkali metal sulfonate base are used as copolymerizable components of the polyester in this invention in order to improve dyeing properties when the polyester is used as fibers.

The metal sulfonate group-containing compound used as a copolymerizable monomer includes, but is not limited to, 5-sodium sulfoisophthalic acid, 2-sodium sulfoterephthalic acid, 5-lithium sulfoisophthalic acid, 2-lithium sulfoterephthalic acid, 5-potassium sulfoisophthalic acid and 2-potassium sulfoterephthalic acid or lower alkyl ester derivatives thereof. In this invention, 5-sodium sulfoisophthalic acid or ester-forming derivatives thereof are preferably used.

The amount of the metal sulfonate-group containing compound copolymerized is preferably 0.3 to 10.0 mol-%, more preferably 0.80 to 5.0 mol-%, relative to the acid components constituting the polyester. When the amount of the compound copolymerized is too low, the resultant polyester is inferior in dyeability with cationic dyes, and when the amount of the compound copolymerized is too high, fibers produced from the resultant polyester may be inferior in fiber productivity and may fail to achieve sufficient strength due to the phenomenon of thickening. Further, when the metal sulfonate-containing compound is copolymerized in an amount of 2.0 mol-% or more, the resultant modified polyester fibers can also be endowed with dyeability at normal pressure. By selecting suitable easy dyeable monomers, the amount of the metal sulfonate group-containing compound used can be suitably reduced. The easy dyeable monomers include, but are not limited to, long-chain glycol compounds such as polyethylene glycol, polytetraethylene glycol and aliphatic dicarboxylic acids such as adipic acid, sebacic acid and azelaic acid.

After the polyester is polymerized according to the process of this invention, the thermal stability of the polyester can be further improved by removing the catalyst from the polyester or by adding a phosphorus type compound to deactivate the catalyst.

The polyester of this invention may contain other arbitrary polymers, antistatic agents, antifoaming agents, dyeing improvers, dyes, pigments, delusterants, optical brighteners, stabilizers, antioxidants and other additives. As the antioxidant, antioxidants such as aromatic amine type or phenol type can be used, and as the stabilizers, stabilizers of phosphorus type such as phosphoric acid and phosphate or stabilizers of sulfur or amine type can be used.

These additives can be added at an arbitrary stage during or after polymerization of polyester or during molding of polyester, and the suitable stage at which the additives are to be added is varied depending on the characteristics of the compound and the performance requirement of molded articles of polyester.

The polyester polymerized by using the polyester polymerization catalyst of this invention can be used to produce fibers in a usual manner by melt spinning wherein spinning and drawing of the polyester may be conducted in 1 or 2 steps. Further, any processes for producing staple fibers by crimping, heat setting and cutting and any known processes producing fibers such as monofilaments can also be used.

The resultant fibers can be various fibers with an odd-shaped section, hollow fibers, composite fibers and dope dyed yarns, and for manufacturing of yarn, for example known techniques such as strand mixing and mixed spinning can also be used.

Further, the polyester fibers can be used as fiber structures such as woven fabrics or nonwoven fabrics.

The polyester fibers can be used as fibers for clothing, interior and bedding fibers in curtains, carpets, futon cotton and fiberfill, fibers for industrial materials such as high tensile strings for tire cords and ropes, civil engineering and building materials, and automobile materials such as air bags, and various kinds of fibers for various fabrics, knitting, nets, and nonwoven fabrics of staple or filament fibers.

The polyester resin of this invention is used preferably as hollow molded articles.

The hollow molded articles include drink containers for mineral water, juice, wine or whiskey, baby's bottles, containers for canned foods, containers for hair conditioners and cosmetics, containers for detergents for houses and tableware.

Among these containers, the hollow molded articles of this invention are particularly preferable as pressure-resistant containers, heat-resistant and pressure-resistant containers and alcohol-resistant containers utilizing the sanitary conditions, strength and solvent resistance of the polyester.

For production of the hollow molded articles, preliminary closed-end molded articles are obtained by a method wherein polyester chips obtained by melt polymerization or solid state polymerization are dried by e.g. vacuum drying and then molded by an extrusion molding machine or an injection molding machine, or by a direct molding method wherein after melt polymerization, the melt is introduced in a molten state into a molding machine and molded. The preliminary molded articles are subjected to blow molding such as drawing blow molding, direct blow molding, extrusion blow molding, to give final hollow molded articles. As a matter of course, the molded articles obtained by the molding machine such as an extrusion molding machine or an injection molding machine can be used as final hollow containers.

In production of such hollow molded articles, the polyester of the invention can be mixed with scrap resin generated in a production process or polyester resin recovered from a market. Even if mixed with such recycled resin, the polyester resin of this invention is hardly degraded, thus giving high-quality hollow molded articles.

Further, such containers can have a multi-layer structure provided as an intermediate layer with a gas barrier resin layer such as polyvinyl alcohol or polymethaxylylene diamine adipate or a light-shielding resin layer or a recycled polyester layer. Further, techniques such as vapor deposition and CVD (chemical vapor deposition) can be used to coat the container with a metal such as aluminum or diamond-shaped carbon.

To improve the crystallizability of openings etc. of the molded articles, other resins such as polyethylene and inorganic nucleating materials such as talc can also be added.

Further, the polyester resin of this invention can also be extruded through an extruding machine into a sheet-shaped material to provide a sheet. The sheet is processed by vacuum molding, pressure forming, pattern embossing etc. and used as trays or containers for foods and sundries, cups, blister packs, carrier tapes for electronic parts, and trays for delivery of electronic parts. Further, the sheet can also be used as various kinds of cards.

These sheets can also have a multi-layer structure provided as an intermediate layer with a gas barrier resin layer, a light-shielding resin layer or a recycled polyester layer as described above.

The polyester resin of this invention can also be mixed with recycled resin. For the purpose of producing crystalline heat-resistant containers, other resins such as polyethylene and inorganic nucleating agents such as talc can be added to improve crystallizability.

The polyester polymerized by using the polyester polymerization catalyst of this invention can be used in film. The method therefor involves melt-extrusion of the polyester and molding it through T-dies into a sheet on a cooled rotating roll, to prepare a non-oriented sheet. In this process, techniques described in e.g. JP-B 6-39521 and JP-B 6-45175 can be used for high-rate manufacture of the film. Using a plurality of extruders, the polyester can be formed by co-extrusion into a multi-layer film having a core layer and skin layer each having functions.

The polyester polymerized by using the polyester polymerization catalyst of this invention can be used as an oriented polyester film. The oriented polyester film can be obtained in a usual manner by drawing the polyester 1.1- to 6-fold in at least one axial direction at a temperature ranging from the glass transition temperature to crystallization temperature of the polyester.

For example, when a biaxially oriented polyester film is to be produced, it is possible to employ a successive biaxial drawing method wherein the polyester is subjected to monoaxial drawing in the lengthwise or width direction and then drawn in the perpendicular direction, a method of simultaneous biaxial drawing in the lengthwise and width directions, a method of using a linear motor for driving simultaneous biaxial drawing, and a multistage drawing method of subjecting polyester to drawing plural times in the same direction by width and lengthwise drawing, or lengthwise, width and lengthwise drawing, or lengthwise, lengthwise and width drawing.

After drawing is finished, heat setting is preferably conducted at a temperature ranging from (the melting point minus 50° C.) to the melting point for 30 seconds or less, preferably 10 seconds or less, followed by lengthwise or width relaxation by 0.5 to 10% in order to reduce the thermal shrinkage of the film.

The thickness of the resultant oriented polyester film is preferably 1 to 1000 μm, more preferably 5 to 500 μm and most preferably 10 to 200 μm. When the thickness is 1 μl or less, the film is limp and difficult to handle. On the other hand, when the thickness exceeds 1000 μm, the film is too hard to handle.

For conferring various functions such as adhesion, mold releasability, antistatic properties, infrared absorption, antimicrobial properties and scuff resistance, a high-molecular resin may be applied by coating onto the surface of the oriented polyester film. Further, inorganic and/or organic particles may be contained in only the coating layer, to form a smooth and highly transparent polyester film. Further, the film may be provided with an inorganic deposited layer to confer various barrier functions against oxygen, water and oligomers or may be provided with an electroconductive layer by sputtering to confer electrical conductivity.

For improving handling properties such as smoothness, covering properties, abrasion resistance and winding properties, the surface of the film may be made uneven by adding inorganic and organic salts particles or heat-resistant polymeric resin particles in the process of polymerizing the polyester. These particles may be those subjected to surface treatment or not subjected to surface treatment, and when surface treatment is carried out, the surface treatment may be hydrophilicity- or hydrophobicity-conferring treatment with inorganic or organic compounds. For example, there is the case where particles subjected to surface treatment for the purpose of improving dispersibility etc. are preferably used.

The inorganic particles added include calcium carbonate, kaolin, talc, magnesium carbonate, barium carbonate, calcium sulfate, barium sulfate, lithium phosphate, calcium phosphate, magnesium phosphate, aluminum oxide, silicon oxide, titanium oxide, zirconium oxide, lithium fluoride, sodium calcium alumisilicate etc.

The organic salt particles added include calcium oxalate and calcium, barium, zinc, manganese or magnesium terephthalate.

The crosslinked polymer particles added include particles of homo- or copolymers consisting of vinyl monomers such as divinyl benzene, styrene, acrylic acid, methacrylic acid, acrylic acid and methacrylic acid. In addition, organic particles such as polytetrafluoroethylene, benzoguanamine resin, thermosetting resin, unsaturated polyester resin, thermosetting urea resin and thermosetting phenol resin may also be used.

The method of incorporating the inert particles into polyester as a substrate film includes, but is not limited to, (a) a method wherein the inert particles are dispersed in a slurry form in diol as a component constituting the polyester and then the inert particle slurry is added to the reaction system for polymerization of the polyester, (b) a method wherein a slurry of the inert particles dispersed in water is added to a melt polyester resin in a vented twin-screw extruder in the step of melt-extrusion of polyester film, (c) a method wherein a polyester resin and the inert particles are kneaded in a molten state, and (d) a method wherein a polyester resin and a master resin of the inert particles are kneaded in a molten state.

In the case of the method of adding the inert particles to the polymerization reaction system, the slurry of the inert particles in diol is added to the reaction system preferably having low melt viscosity before esterification reaction, transesterification reaction or polycondensation reaction. To prepare the slurry of the inert particles in diol, physical dispersion treatment by a high-pressure dispersing machine or a bead mill or dispersion by sonication is preferably conducted. For stabilizing the dispersed slurry, chemical dispersion stabilizing treatment is used in combination depending on the type of particles used.

In the dispersion stabilizing treatment in the case of e.g. inorganic oxide particles or crosslinked polymer particles having carboxyl groups on the surfaces of the particles, alkali compounds such as sodium hydroxide, potassium hydroxide and lithium hydroxide are added to the slurry, and by electrical repulsion, re-aggregation of the particles can be prevented. In the case of calcium carbonate particles and hydroxyapatite particles, sodium tripolyphosphate and potassium tripolyphosphate are added preferably to the slurry.

Upon addition of the slurry of the inert particles in diol to the polyester polymerization reaction system, heat treatment of the slurry at a temperature near to the boiling point of diol is preferable for dispersibility of the particles because heat shock (difference in temperature between the slurry and the polymerization reaction system) upon addition of the slurry to the polymerization reaction system can be reduced by the heat treatment.

These additives can be added at any arbitrary stages during or after polyester polymerization or after production of polyester film, and the suitable stage at which the additives are added is varied depending on the characteristics of the compound and the performance requirement of polyester film.

Further, the polyester of the invention is excellent in thermal stability, so it is suitable that when the polyester is used to produce films, film edges occurring in the drawing step or films not meeting standards can be reutilized by melting.

The oriented polyester film of this invention is used preferably as antistatic film, easily adhering film, film for cards, film for dummy cans, film for agriculture, film for building materials, decorative materials, wall papers, OHP film, printing film, film for ink jet recording, film for sublimation transfer recording, film for laser beam printer recording, film for electrophotographic recording, film for thermal transfer recording, film for heat-sensitive transfer recording, film for printed substrate wiring, film for membrane switching, film for plasma displays, film for tough panels, masking film, film for photoengraving, X-ray film, photographic negative film, phase-difference film, polarizing film, polarizing film protection (TAC) film, protect film, photosensitive resin film, visual-field enlargement film, diffuser sheet, reflective film, anti-glare film, electroconductive film, separator, film for UV shielding, and back-grind tapes.

For antistatic film, techniques described in Japanese Patent No. 2952677 and JP-A 6-184337 can be used. For easily adhering film, techniques described in e.g. JP-B 7-108563, JP-A 10-235820 and JP-A 11-323271 can be applied to the film of this invention, and for cards, techniques described in e.g. JP-A 10-171956 and JP-A 11-010815 can be applied to the film of this invention. As a dummy can film in place of a sheet-shaped cylinder described in e.g. JP-A 10-101103, the film of this invention can be used by printing a design thereon and then forming it in a cylindrical or semi-cylindrical form. For building materials, decorative sheets for building materials, and decorative materials, the film of this invention can be used as the substrate sheet described in e.g. JP-A 5-200927 or as the transparent sheet described in JP-A 07-314630. For OHP (over head projector), the film of this invention can be used as the transparent resin sheet described in JP-A 06-297831 or as the transparent polymeric synthetic resin film described in JP-A 08-305065. For ink jetting recording, the film of this invention can be used as the transparent base material described in e.g. JP-A 05-032037. For sublimation transfer recording, the film of this invention can be used as the transparent film described in e.g. JP-A 2000-025349. For laser beam printers or electrophotographic recording, the film of this invention can be used as the plastic film described in e.g. JP-A 5-088400. For thermal transfer recording, the film of this invention can be used in a method described in e.g. JP-A 07-032754, and for heat-sensitive recording, the film of this invention can be used in a method described in e.g. JP-A 11-034503. For printed substrate, the film of this invention can be used as the polyester film described in e.g. JP-A 06-326453. For membrane switching, the film of this invention can be used in a method described in e.g. JP-A 05-234459. For optical filters (hot-wire filters, plasma displays), the film of this invention can be used in a method described in e.g. JP-A 11-231126. For transparent electroconductive film and touch panel, the film of this invention can be used in a method described in e.g. JP-A 11-224539. For masking film, the film of this invention can be used in a method described in e.g. JP-A 05-273737. For photoengraving, the film of this invention can be used in a method described in e.g. JP-A 05-057844. For photographic negative film, the film of this invention can be used as the polyethylene terephthalate film described in e.g. column No. (0123) in JP-A 06-167768. For phase-difference film, the film of this invention can be used as the film described in e.g. JP-A 2000-162419. For separator, the film of this invention can be used as the film described in e.g. column No. (0012) in JP-A 11-209711. For UV shielding, the film of this invention can be used as the polyester film described in e.g. JP-A 10-329291. An agricultural film can be obtained by applying the film of this invention to the polyethylene terephthalate film described in e.g. JP-A 10-166534. An adhesive-backed sheet can be obtained by applying the oriented polyester film of this invention to the polyethylene terephthalate film described in e.g. JP-A 06-122856.

EXAMPLES

Hereinafter, the constitution and effect of this invention are described in more detail by reference to the Examples, which are not intended to limit this invention.

Evaluation Methods

1) Intrinsic viscosity (IV)

Polyester was dissolved in a mixed solvent of phenol/1,1,2,2-tetrachloroethane in the ratio of 6/4 (by weight) and measured at a temperature of 30° C.

2) Acid value (AV)

0.1 g polyester polymer was heated and dissolved in 10 ml benzyl alcohol, and measured by titration with 0.1 N NaOH in methanol/benzyl alcohol (1/9).

3) Content of diethylene glycol (DEG)

0.1 g polyester was decomposed by heating at 250° C. in 2 ml methanol and quantified by gas chromatography.

4) Differential scanning calorimetry (DSC)

DSC2920 manufactured by TA Instruments was used for measurement. 10.0 mg polyester was placed in an aluminum pan and heated to 280° C. at an increasing temperature of 50° C./min., and when 280° C. was reached, the sample was kept for 1 minute and immediately quenched in liquid nitrogen. Thereafter, the sample was heated from room temperature to 300° C. at an increasing temperature of 20° C./min., during which the crystallization temperature Tc1 and melting point Tm were determined. When 300° C. was reached, the sample was kept at that temperature for 2 minutes and then cooled at a decreasing temperature of 10° C./min., during which the crystallization temperature Tc2 was determined. Tc1, Tm and Tc2 were maximum peak temperatures respectively.

5) Color tone

When predetermined torque was reached in melt polymerization, nitrogen was introduced into the autoclave and returned to normal pressure, and the polycondensation reaction was terminated. Thereafter, the polymer was quenched under slight pressure by discharging it in a strand form into cold water and thereafter maintained for about 20 seconds in cold water, and cut into cylindrical resin chips of about 3 mm in length and about 2 mm in diameter. The resin chips thus obtained were air-dried for about one day on a filter paper at room temperature and used in color measurement. In color measurement, the PET resin chips having an IV of about 0.65 dl/g obtained by melt polymerization were measured for Hunter's L value, a value and b value by a color difference meter (Model TC-1500MC-88, manufactured by Tokyo Denshoku Co., Ltd.).

6) Solution haze (haze)

Melt-polymerized PET resin chips having an IV of about 0.65 dl/g were dissolved in a mixed solvent of p-chlorophenol/1,1,2,2-tetrachloroethane in the ratio of 3/1 (by weight) to give 8 g/100 ml solution which was then measured at room temperature by a turbidity meter model NDH2000 manufactured by Nippon Denshoku Co., Ltd. In this measurement, diffused transmitted light (DF) and total transmitted light (TT) in the solution were measured by a cell of 1 cm in length according to JIS standards JIS-K7105, and the haze (%) was determined according to the following equation:

$$\text{Haze (\%)} = (DF/TT) \times 100$$

7) Thermal stability parameter (TS)

TS was determined as follows: 1 g of melt-polymerized PET resin chips having an IV of about 0.65 dl/g ($[IV]_i$ before the melting test) were placed in a glass test tube having an internal diameter of about 14 mm and then vacuum-dried at 130° C. for 12 hours, and the glass test tube was connected to a vacuum line where the replacement of the atmosphere by nitrogen was conducted five or more times by introducing nitrogen under reduced pressure, to achieve a nitrogen atmosphere at 100 mmHg in the glass test tube which was then was sealed. This test tube was dipped in a salt bath at 300° C. and maintained for 2 hours in a molten state, and the sample was removed, frozen and milled, and vacuum-dried to determine the IV ($[IV]_{f1}$ after the melting test). From the $[IV]_{f1}$, TS was calculated using the equation below. The equation is from a previous report (Kamiyama et al.: Journal of Society of Rubber Industry, Japan, vol. 63, no. 8, p. 497, 1990).

$$TS = 0.245 \{[IV]_{f1}^{-1.47} - [IV]_i^{-1.47}\}$$

8) Thermal oxidation stability parameter (TOS)

Melt-polymerized PET resin chips having an IV of about 0.65 dl/g were frozen and milled to give powders of 20 meshes or less. The powders were vacuum-dried at 130° C. for 12 hours, and 300 mg of the powders were placed in a glass test tube having an inner diameter of about 8 mm and a length of about 140 mm, vacuum-dried at 70° C. for 12 hours, and heated at 230° C. for 15 minutes in air dried by connecting a dry tube containing silica gel to an upper part of the test tube dipped in a salt bath. From the IV of the PET after this heating, TOS was determined according to the same equation shown later as for TS above. In the equation, $[IV]_i$ and $[IV]_{f3}$ refer to IV (dl/g) before and after the heating test respectively. Freezing and milling was conducted using a freezer mill (6750 model, US Spex Inc.). About 2 g resin chips and a special impactor were placed in a special cell, and the cell was set in the mill, and liquid nitrogen was introduced into the mill and maintained for about 10 minutes, and the sample was milled for 5 minutes at a rate of 10 (at which the impactor was inverted about 20 times per second).

$$TOS=0.245\{[IV]_{f3}^{-1.47}-[IV]_i^{-1.47}\}$$

9) Hydrolytic stability parameter (HS)

Melt-polymerized PET resin chips having an intrinsic viscosity of about 0.65 dl/g ($[IV]_i$ before the test) were frozen and milled in the manner as in 8) above, to give powders of 20 meshes or less which were then vacuum-dried at 130° C. for 12 hours. A hydrolysis test was conducted using a mini-color unit (Type M12. ELB, manufactured by Texam Giken Co., Ltd.). 1 g of the powders, together with 100 ml purified water, were placed in a special stainless steel beaker, and a special stirring blade was added to it, and in a closed system, the beaker was set in the mini-color unit and stirred under heating at 130° C. under pressure for 6 hours. After the test, the PET was collected on a glass filter, vacuum-dried and then measured for IV ($[IV]_{f2}$), to determine the hydrolysis stability parameter (HS) by using the equation below.

$$HS=0.245\{[IV]_{f2}^{-1.47}-[IV]_i^{-1.47}\}$$

10) Oligomer acid value ($AV_0$)

The oligomer is milled and dried under reduced pressure at 110° C. for 15 hours or more. 20 ml pyridine is added to about 1 g of the accurately weighed sample. The sample is dissolved by boiling for 15 minutes. After dissolution, 10 ml purified water is added thereto, and the sample solution is left and cooled. The sample is titrated with 1/10 N NaOH with phenolphthalein as an indicator. A blank sample free of the sample is also examined in the same procedure. If the oligomer is not dissolved in pyridine, it is examined in benzyl alcohol.

$AV_0$ (eq/ton) is calculated according to the following equation:

$$AV_0=(A-B)\times 0.1\times f\times 1000/W$$

wherein A=titration volume (ml), B=titration volume (ml) of the blank, f=factor of NaOH, W=weight of the sample (g).

11) Oligomer OH value ($OHV_0$)

The oligomer is milled and dried under reduced pressure at 110° C. for 15 hours or more. 20 ml pyridine is added to about 0.5 g of the accurately weighed sample, and 10 ml of an acetylating agent (anhydrous acetic acid-pyridine solution, 0.5 mol-%/L) is added thereto. After the sample solution is dipped in a water bath at 95° C. or more for 1.5 hours, 10 ml purified water is added thereto, and the sample solution is left and cooled. The sample is titrated with 1/5 N NaOH with phenolphthalein as an indicator. A blank sample free of the sample is also examined in the same procedure.

$OHV_0$ (eq/ton) is calculated according to the following equation:

$$OHV_0=\{(B-A)\times 0.2\times f\times 1000/W\}+AV_0$$

wherein A=titration volume (ml), B=titration volume (ml) of the blank, f=factor of 1/5 NaOH, W=weight of the sample (g).

12) Calculation of Pn $$Pn \text{ (degree of polymerization)}=[MW+26-88\times\{OHV_0/(AV_0+OHV_0)\}]/(192+44E)$$

wherein $MW$ (molecular weight (g/mol))=$10^6\times 2/(AV_0+OHV_0)$ $$E=DEG/(EG+DEG)$$

wherein E is the molar fraction of diethylene glycol formed, DEG is the number of moles of diethylene glycol in the polymer, and EG is the number of moles of ethylene glycol.

13) Calculation of the degree of esterification (Es (%))

$$\text{Degree of esterification}=[1-AV_0/\{Pn(AV_0+OHV_0)\}]\times 100$$

14) Measurement of grain size

The particles were dispersed by sonication in a solvent not dissolving them, and their grain size was measured by use of Microtrac FRA-9220 (Nikkiso). Aluminum trisacetylacetonate powder was dispersed in Nisseki Mitsubishi Super Mulpass 5K20J2 and measured for its grain size.

15) Strength and elongation of drawn yarn

Strength and elongation were measured 5 times respectively by Tensilone (Orientec) under the conditions of a gauge length of 200 mm and a crosshead speed of 200 mm/min., and the average was used for evaluation.

16) Orientation of drawn yarn

The average (n=5) was determined on the basis of retardation and fiber diameter by a polarizing microscope equipped with a Berek compensator.

17) Density of drawn yarn

The average density of samples (n=3) was determined at 30° C. in a density gradient tube consisting of a mixture of calcium nitrate.$4H_2O$ and purified water.

18) Color tone after interweaving and refining

Eight samples were piled up and measured by a spectrometric color measuring instrument CM-3700 manufactured by Minolta Co., Ltd., to determine L*, a*, and b*.

19) Haze (haze-%)

Determined by a haze meter model NDH2000 manufactured by Nippon Denshoku Co., Ltd.

20) Acetaldehyde Content

The sample and distilled water were introduced in a ratio of sample/distilled water=1 g/2 ml into a glass ampoule flushed with nitrogen, and the upper part of the ampoule was melt-sealed, and the sample was extracted at 160° C. for 2 hours, and after cooling, the concentration of acetaldehyde in the extract was measured by high-sensitive gas chromatography and expressed in ppm.

21) Strength and elongation of biaxially drawn film

The film was cut into strips of 10 mm in width and 180 mm in length and set in a tensile testing machine (RTM100, manufactured by Toyo Baldwin) with the distance between chucks adjusted to 100 mm, and measured at a drawing rate of 100 mm/min. under the environment of 23° C.×65% RH.

22) Specific resistance of melt polymer ($\rho i$)

Two electrode plates were placed in polyester melted at 275° C., and the current ($i_0$) upon application of a voltage of 120 V is measured, and the specific resistance $\rho i$ is determined according to the following equation:

$$\rho i \text{ }(\Omega\cdot cm)=A/l\times V/i_0$$

wherein A=the area of the electrode ($cm^2$), l=the distance between the electrodes (cm), V=voltage (V).

23) Color tone of hollow molded article

A sample is cut off from the body (wall thickness, about 0.4 mm) of a 1500-ml bottle obtained by biaxially drawing blow molding, and then measured for its Hunter's L value, a value and b value by a color difference meter Model TC-1500MC-88 (Tokyo Denshoku Co., Ltd.).

Synthesis Example of Polyester

Example 1

To a mixture of bis(2-hydroxyethyl)terephthalate and oligomers produced in a usual manner from high-purity terephthalic acid and ethylene glycol were added 13 g/l aluminum chloride as a polycondensation catalyst in ethylene glycol in an amount of 0.015 mol-% in terms of aluminum atom relative to the acid component in the polyester and 10 g/l Irganox 1425 (Ciba Specialty Chemicals Inc.) in ethylene glycol in an amount of 0.02 mol-% in terms of Irganox 1425 relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa.

The polyethylene terephthalate (PET) having an IV of 0.65 dl/g, obtained in the polycondensation described above, was formed in a usual manner into chips. Measurement results such as the time necessary for the polycondensation reaction and the intrinsic viscosity, acid value and color tone of PET after polycondensation are shown in Table 1.

The PET resin chips were examined in a melt test to determine the thermal stability parameter (TS).

The chipped PET resin was milled in a usual manner, and the powder was examined in a hydrolytic test and a thermal oxidation stability test to determine the hydrolytic stability (HS) parameter and the thermal oxidation stability (TOS) parameter, and these results are shown in Table 1.

Examples 2 and 3

PET was prepared in the same manner as in Example 1 except that the type of the catalyst used was changed. Evaluation was also conducted in the same manner as in Example 1. The composition of the catalyst used and evaluation results are shown in Table 1. A catalyst component lithium acetate.$2H_2O$ was added in the form of 50 g/l solution in ethylene glycol in the amount shown in Table 1, which is expressed in terms of lithium atom relative to the acid component in PET.

Comparative Example 1

Production of PET was attempted in the same manner as in Example 1 except that Irganox 1425 was not used as a polycondensation catalyst component. The polycondensation reaction was performed for 180 minutes, but a sufficient degree of polymerization could not be reached.

Comparative Example 2

The same procedure as in Example 1 was repeated except that antimony trioxide was used in an amount of 0.05 mol-% in terms of antimony atom relative to the acid component in PET. The evaluation results are also shown in Table 1.

Evaluation Results

As can be seen from the results in Table 1, the catalysts of this invention have a high polymerization activity, that is, the polycondensation time required for the intrinsic viscosity to reach the practical value of 0.65 dl/g is short, and the resultant polyester is excellent in color tone, has low TS and is excellent in thermal stability and superior in thermal oxidation stability and hydrolytic stability.

On the other hand, the catalyst not using the phosphorus compound of this invention is poor in polymerization activity, while the catalyst using antimony trioxide has a high polymerization activity, but problems such as gray discoloration and insoluble particles as described above are inevitable.

Example 4

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 110 minutes at a pressure of 0.25 MPa at 250° C. while water was distilled away from the system, whereby a mixture of bis(2-hydroxyethyl)terephthalate (BHET) and oligomers (referred to hereinafter as BHET mixture) having a degree of esterification of 95% or more was obtained. To this BHET mixture were added 2.5 g/l aluminum acetylacetonate as a polycondensation catalyst in ethylene glycol in an amount of 0.014 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component, and the mixture was stirred at 250° C. for 15 minutes in a nitrogen atmosphere at normal pressure. Then, the temperature was increased to 275° C. over 60 minutes while the pressure in the reaction system was gradually reduced to 66.5 Pa (0.5 Torr), and the polycondensation reaction was further conducted at 275° C. at 66.5 Pa. The polycondensation time necessary for obtaining PET having an IV of 0.61 dl/g was 123 minutes, indicating that this catalyst had a practical catalytic activity. The physical properties of the resultant PET are shown in Table 2.

Example 5

<Preparation Example 1 for Solution of Aluminum Hydroxide Chloride in Mixed Solvent of Water/Ethylene Glycol>

Ethylene glycol was added to about 10% (in terms of $Al_2O_3$) aqueous solution of polyaluminum chloride represented by the structural formula $[Al_2(OH)_nCl_{6-n}]_m$ (n is about 3, $m \leq 10$) in the ratio of about 50:1 by volume and stirred to prepare a solution.

<Polymerization Example of Polyester>

Polyester was polymerized in the same manner as in Example 4 except that the solution of polyaluminum chloride in a mixed solvent of water/ethylene glycol was added as a polycondensation catalyst in an amount of 0.014 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component. The polymerization time was 119 minutes, and the IV of the resulting PET was 0.61 dl/g. Other physical properties are shown in Table 2.

Example 6

<Preparation Example 2 for Solution of Aluminum Hydroxide Chloride in Mixed Solvent of Water/Ethylene Glycol>

Ethylene glycol was added to about 10% (in terms of $Al_2O_3$) aqueous suspension of basic aluminum chloride represented by the structural formula $[Al_2(OH)_nCl_{6-n}]_m$ (n is about 5) in the ratio of about 50:1 by volume and stirred to prepare a solution.

<Polymerization Example of Polyester>

Polyester was polymerized in the same manner as in Example 4 except that the solution of basic aluminum chloride in a mixed solvent of water/ethylene glycol was added as a polycondensation catalyst in an amount of 0.014 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component. The polymerization time was 125 minutes, and the IV of the resulting PET was 0.60 dl/g. Other physical properties are shown in Table 2.

Example 7

Polyester was synthesized in the same manner as in Example 4 except that 5 g/l aluminum chloride.$6H_2O$ in ethylene glycol was added as a polycondensation catalyst in an amount of 0.014 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component. The polymerization time was 121 minutes, and the IV of the resulting PET was 0.60 dl/g. Other physical properties are shown in Table 2.

Example 8

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and 8 g/l Irganox 1222 (Ciba Specialty Chemicals Inc.) in ethylene glycol in an amount of 0.03 mol-% in terms of Irganox 1222 relative to the acid component, and the mixture was subjected to esterification reaction for 110 minutes at a pressure of 0.25 MPa at 250° C. while water was distilled away from the system, whereby a mixture of bis(2-hydroxyethyl)terephthalate (BHET) and oligomers (referred to hereinafter as BHET mixture) having a degree of esterification of 95% or more was obtained. To this BHET mixture were added the above polyaluminum chloride solution as a polycondensation catalyst in a mixed solvent of water/ethylene glycol in an amount of 0.014 mol-% in terms of aluminum atom relative to the acid component in the polyester and 10 g/l of magnesium acetate.$4H_2O$ in ethylene glycol in an amount of 0.01 mol-% in terms of magnesium atom relative to the acid component, and the mixture was stirred at 250° C. for 15 minutes in a nitrogen atmosphere at normal pressure. Then, the temperature was increased to 275° C. over 60 minutes while the pressure in the reaction system was gradually reduced to 66.5 Pa (0.5 Torr), and the polycondensation reaction was further conducted at 275° C. at 66.5 Pa. The polycondensation time necessary for obtaining PET having an IV of 0.60 dl/g was 123 minutes, indicating that this catalyst had a practical catalytic activity. The physical properties of the resultant PET are shown in Table 2.

Comparative Example 3

Polyester was polymerized in the same manner as in Example 4 except that antimony trioxide was added as a polycondensation catalyst in an amount of 0.04 mol-% in terms of antimony atom relative to the acid component in the polyester. The polymerization time was 112 minutes, and the IV of the resulting PET was 0.61 dl/g. Other physical properties are shown in Table 2.

Example 9

<Preparation Example for Solution of Basic Aluminum Acetate in Mixed Solvent of Water/Ethylene Glycol>

Basic aluminum acetate (hydroxy aluminum diacetate, manufactured by ALDRICH) was added to deionized water at a concentration of 1g/50 ml and stirred for 12 hours at ordinary temperature. Thereafter, the solution was stirred at about 70° C. for 6 hours to give a transparent aqueous solution. Ethylene glycol was added to this aqueous solution in the ratio of 3:1 by volume and stirred at room temperature for 6 hours to prepare a catalyst solution.

<Polymerization Example of Polyester>

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction for 115 minutes at a pressure of 0.25 MPa at 250° C. while water was distilled away from the system, whereby a mixture of bis(2-hydroxyethyl)terephthalate (BHET) and oligomers (referred to hereinafter as BHET mixture) having a degree of esterification of 95% or more was obtained. To this BHET mixture were added the above basic aluminum acetate solution as a polycondensation catalyst in a mixed solvent of water/ethylene glycol in an amount of 0.014 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component, and the mixture was stirred at 250° C. for 15 minutes in a nitrogen atmosphere at normal pressure. Then, the temperature was increased to 275° C. over 60 minutes while the pressure in the reaction system was gradually reduced to 66.5 Pa (0.5 Torr), and the polycondensation reaction was further conducted at 275° C. at 66.5 Pa. The polycondensation time necessary for obtaining PET having an IV of 0.61 dl/g was 132 minutes, indicating that this catalyst had a practical catalytic activity. The physical properties of the resultant PET are shown in Table 3.

Example 10

<Preparation Example 1 for Solution of Basic Aluminum Acetate in Ethylene Glycol>

While the above basic aluminum acetate in a mixed solvent of water/ethylene glycol was stirred at 90 to 110° C. for several hours, water was distilled away. As a result, a solution of basic aluminum acetate at a concentration of about 6.5 g/l in ethylene glycol was obtained.

<Polymerization Example of Polyester>

Polyester was polymerized in the same manner as in Example 9 except that the solution of basic aluminum acetate in ethylene glycol was added as a polycondensation catalyst in an amount of 0.014 mol-% in terms of aluminum atom relative to the acid component in the polyester and 100 g/l Irganox 1425 (Ciba Specialty Chemicals Inc.) in ethylene glycol was added in an amount of 0.01 mol-% in terms of Irganox 1425 relative to the acid component. The polymerization time was 133 minutes, and the IV of the resulting PET was 0.60 dl/g. Other physical properties are shown in Table 3.

Example 11

<Preparation Example 2 for Solution of Basic Aluminum Acetate in Ethylene Glycol>

Basic aluminum acetate ($CH_3COOAl(OH)_2 \cdot 1/3H_3BO_3$, manufactured by ALDRICH) was stirred in ethylene glycol at about 70° C. for 5 hours, to give a solution thereof at a concentration of about 5 g/l in ethylene glycol.

<Polymerization Example of Polyester>

Polyester was polymerized in the same manner as in Example 1 except that the above 5 g/l basic aluminum acetate solution in ethylene glycol was added as a polycondensation catalyst in an amount of 0.014 mol-% in terms of aluminum atom relative to the acid component in the polyester and 10 g/l Irganox 1425 (Ciba Specialty Chemicals Inc.) in ethylene glycol in an amount of 0.01 mol-% in terms of Irganox 1425 relative to the acid component. The polymerization time was 90 minutes, and the IV of the resulting PET was 0.65 dl/g. The IV of the resulting PET was 2 equivalents/ton, the Tm was 256° C., the L value was 68.9, the a value was −2.3, and the b value was 4.2.

Example 12

<1 Preparation Example for Solution of Aluminum Lactate in Ethylene Glycol>

About 67 g/l aqueous aluminum lactate solution was prepared at normal temperatures. Thereafter, ethylene glycol was added thereto, and water was distilled away by heating at about 100° C., whereby about 29 g/l solution thereof in ethylene glycol was obtained.

<Polymerization Example of Polyester>

Polyester was polymerized in the same manner as in Example 9 except that the solution of aluminum lactate in ethylene glycol was added as a polycondensation catalyst in an amount of 0.014 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component. The polymerization time was 124 minutes, and the IV of the resulting PET was 0.60 dl/g. Other physical properties are shown in Table 3.

Example 13

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction at a pressure of 0.25 MPa at 250° C. while water was distilled away from the system, whereby a BHET mixture having a degree of esterification of 95% or more was obtained. To this BHET mixture were added 2.5 g/l aluminum trisacetylacetonate solution as a polycondensation catalyst in ethylene glycol in an amount of 0.007 mol-% in terms of aluminum atom relative to the acid component in the polyester and 100 g/l Irganox 1425 (Ciba Specialty Chemicals Inc.) in ethylene glycol in an amount of 0.005 mol-% in terms of Irganox 1425 relative to the acid component, and further 35 g/l potassium titanyl oxalate.$2H_2O$ in ethylene glycol in an amount of 0.0004 mol-% in terms of titanium atom relative to the acid component, and the mixture was stirred at 250° C. for 15 minutes in a nitrogen atmosphere at normal pressure. Then, the temperature was increased to 275° C. over 60 minutes while the pressure in the reaction system was gradually reduced to 66.5 Pa (0.5 Torr), and the polycondensation reaction was further conducted at 275° C. at 66.5 Pa. The polycondensation time necessary for obtaining PET having an IV of 0.61 dl/g was 93 minutes, indicating that this catalyst had a higher catalytic activity than a usual antimony catalyst. The AV of the resulting PET was 2 equivalents/ton, the Tm was 257° C., the L value was 67.7, the a value was −1.7, and the b value was 3.7.

Example 14

PET was polymerized in the same manner as in Example 13 except that 2.5 g/l aluminum trisacetylacetonate solution in ethylene glycol was added as a polycondensation catalyst in an amount of 0.007 mol-% in terms of aluminum atom relative to the acid component in the polyester and 100 g/l Irganox 1425 (Ciba Specialty Chemicals Inc.) in ethylene glycol in an amount of 0.005 mol-% in terms of Irganox 1425 relative to the acid component, and further, a composite oxide of titanium oxide/silicon oxide (titanium/silicon=9/1) was added in an amount of 4 ppm relative to the polyester to be obtained by polymerization. The polycondensation time necessary for obtaining PET having an IV of 0.61 dl/g was 109 minutes, indicating that this catalyst had a practical catalytic activity. The Tm of the resulting PET was 256° C., the L value was 67.7, the a value was −1.5, and the b value was 3.3.

Example 15

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and 8 g/l aqueous germanium dioxide solution was added in an amount of 0.006 mol-% in terms of germanium atom relative to the acid component in the polyester, and the mixture was subjected to esterification reaction for 110 minutes at a pressure of 0.25 MPa at 250° C. while water was distilled away from the system, whereby a BHET mixture having a degree of esterification of 95% or more was obtained. To this BHET mixture were added 2.5 g/l aluminum trisacetylacetonate solution as a polycondensation catalyst in ethylene glycol in an amount of 0.007 mol-% in terms of aluminum atom relative to the acid component in the polyester and 100 g/l Irganox 1425 in ethylene glycol in an amount of 0.005 mol-% in terms of Irganox 1425 relative to the acid component, and the mixture was stirred at 250° C. for 15 minutes in a nitrogen atmosphere at normal pressure. Then, the temperature was increased to 275° C. over 60 minutes while the pressure in the reaction system was gradually reduced to 66.5 Pa (0.5 Torr), and the polycondensation reaction was further conducted at 275° C. at 66.5 Pa. The polycondensation time necessary for obtaining PET having an IV of 0.61 dl/g was 129 minutes, indicating that this catalyst had a practical catalytic activity. The AV of the resulting PET was 2 equivalents/ton, the Tm was 255° C., the L value was 66.3, the a value was −1.4, and the b value was 2.4.

Example 16

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and 8 g/l Irganox 1222 in ethylene glycol was added in an amount of 0.03 mol-% in terms of Irganox 1222 relative to the acid component in the polyester, and the mixture was subjected to esterification reaction for 115 minutes at a pressure of 0.25 MPa at 250° C. while water was distilled away from the system, whereby a BHET mixture having a degree of esterification of 95% or more was obtained. To this BHET mixture were added 2.5 g/l aluminum trisacetylacetonate solution as a polycondensation catalyst in ethylene glycol in an amount of 0.014 mol-% in terms of aluminum atom relative to the acid component in the polyester and 14 g/l antimony atom in ethylene glycol in an amount of 0.01 mol-% in terms of antimony atom relative to the acid component, and the mixture was stirred at 250° C. for 15 minutes in a nitrogen atmosphere at normal pressure. Then, the temperature was increased to 275° C. over 60 minutes while the pressure in the reaction system was gradually reduced to 66.5 Pa (0.5 Torr), and the polycondensation reaction was further conducted at 275° C. at 66.5 Pa. The polycondensation time necessary for obtaining PET having an IV of 0.61 dl/g was 115 minutes, indicating that this catalyst had a practical catalytic activity. The AV of the resulting PET was 3 equivalents/ton, the Tm was 256° C., the L value was 64.8, the a value was −0.7, and the b value was 1.9.

Example 17

A heat transfer medium-circulating 2-L stainless steel autoclave equipped with a stirrer was charged with high-purity terephthalic acid and ethylene glycol in the molar ratio of 1:2, and triethylamine was added in an amount of 0.3 mol-% relative to the acid component, and the mixture was subjected to esterification reaction at a pressure of 0.25 MPa at 245° C. while water was distilled away from the system, whereby a mixture of bis(2-hydroxyethyl)terephthalate (BHET) and oligomers (referred to hereinafter as BHET mixture) shown in Table 4 was obtained. To this BHET mixture were added 2.5 g/l aluminum trisacetylacetonate solution in ethylene glycol in an amount of 0.008 mol-% in terms of aluminum atom relative to the acid component in the polyester and 10 g/l Irganox 1425 (Ciba Specialty Chemicals Inc.) in ethylene glycol in an amount of 0.012 mol-% in terms of Irganox 1425 relative to the acid component, and the mixture was stirred at 245° C. for 15 minutes in a nitrogen atmosphere at normal pressure. Then, the temperature was increased to 275° C. over 60 minutes while the pressure in the reaction system was gradually reduced to 13.3 Pa (0.1 Torr), and the polycondensation reaction was further conducted at 275° C. at 13.3 Pa. The PET resin chips obtained by the polycondensation were examined for various physical properties. The results are shown in Table 5.

Examples 18 and 19

A polymer was polymerized in the same manner as in Example 17 except that the esterification termination time was changed. The physical properties of the BHET mixture are shown in Table 4, and the polymerization results are shown in Table 5.

Example 20

A polymer was polymerized in the same manner as in Example 18 except that the ratio of ethylene glycol/high-purity terephthalic acid (EG/TPA) added was changed. The physical properties of the BHET mixture are shown in Table 4, and the polymerization results are shown in Table 5.

Example 21

A polymer was polymerized in the same manner as in Example 18 except that the amount of the catalyst added was changed. The physical properties of the BHET mixture are shown in Table 4, and the polymerization results are shown in Table 5.

Examples 22 and 23

A polymer was polymerized in the same manner as in Example 17 except that Irganox 1222 (Ciba Specialty Chemicals Inc.) was used as the phosphorus compound, and the amount of the catalyst added was changed as shown in Table 4. The physical properties of the BHET mixture upon addition of the phosphorus compound are shown in Table 4, and the polymerization results are shown in Table 5. In Example 23, Irganox 1222 (Ciba Specialty Chemicals Inc.) was added at the time of charging before esterification reaction.

Example 24

A polymer was polymerized in the same manner as in Example 18 except that 30 g/l aluminum trisacetylacetonate slurry having an average particle diameter of 5.6 μm in ethylene glycol was added. The physical properties of the BHET mixture are shown in Table 4, and the polymerization results are shown in Table 5. Sedimentation of the slurry was at a practically unproblematic level.

Example 25

A polymer was polymerized in the same manner as in Example 18 except that aluminum trisacetylacetonate and the powder of the phosphorus compound were wrapped with a polyester film and added. The physical properties of the BHET mixture are shown in Table 4, and the polymerization results are shown in Table 5.

Example 26

A catalyst solution was prepared by dissolving 0.24 g aluminum trisacetylacetonate and 0.36 g Irganox 1425 (Ciba Specialty Chemicals Inc.) in 100 ml ethylene glycol. A polymer was polymerized in the same manner as in Example 18 except that the catalyst solution was added in an amount of 0.014 mol-% in terms of aluminum atom relative to the acid component in the polyester. The polymerization time and the physical properties of the polymer were almost the same as in the case where the aluminum compound and the phosphorus compound were added separately.

Example 27

A stainless steel autoclave equipped with a stirrer was charged with high-purity terephthalic acid and ethylene glycol in the molar ratio of 1:2, and triethylamine was added in an amount of 0.3 mol-% relative to the acid component, and Irganox 1222 (Ciba Specialty Chemicals Inc.) was added in an amount of 0.03 mol-% in terms of Irganox 1222 relative to the acid component, and the mixture was subjected to esterification reaction for 110 minutes at a pressure of 0.25 MPa at 260° C. while water was distilled away from the system, whereby a BHET mixture was obtained. To this BHET mixture was added 3 g/l aluminum trisacetylacetonate in ethylene glycol in an amount of 0.014 mol-% in terms of aluminum atom relative to the acid component in the polyester, and the mixture was stirred at 260° C. for 20 minutes in a nitrogen atmosphere at normal pressure. Then, the temperature was increased to 280° C. over 50 minutes while the pressure in the reaction system was gradually reduced to 13.3 Pa (0.1 Torr), and the polycondensation reaction was further conducted at 280° C. at 13.3 Pa. The polycondensation reaction was carried out for 150 minutes, whereby PET having an IV of 0.61 dl/g was obtained.

Example 28

To a mixture of bis(2-hydroxyethyl)terephthalate and oligomers produced in a usual manner were added aluminum trisacetylacetonate slurry as a polycondensation catalyst in ethylene glycol in an amount of 0.07 mol-% in terms of aluminum atom relative to the acid component in the polyester and 10 g/l Irganox 1425 (Ciba Specialty Chemicals Inc.) in an amount of 0.03 mol-% in terms of Irganox 1425 relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa. PET having an IV of 0.62 dl/g was obtained.

Example 29

2.5 g powder of aluminum trisacetylacetonate (99.9% or more purity, manufactured by Kanto Kagaku Co., Ltd.) and 1000 ml ethylene glycol were introduced into a glass vessel and stirred under heating with a hot stirrer set at a temperature of 70° C. After the powder was completely dissolved, the solution was returned to room temperature. The solution was stored at 50° C.

Separately, 100 g powder of Irganox 1425 (Ciba Specialty Chemicals Inc.) and 1000 ml ethylene glycol were introduced into a glass vessel and stirred at room temperature for 24 hours or more, whereby Irganox 1425 was completely dissolved. The solution was stored at room temperature.

A heat transfer medium-circulating 2-L stainless steel autoclave equipped with a stirrer, a distillation column, a pressure regulator and a nitrogen line, wherein the heat transfer medium was set at 220° C., was charged with 291 ml ethylene glycol, 432 g high-purity terephthalic acid and 1.1 ml triethylamine under stirring. Thereafter, the reaction tank was shut tightly by closing a cock of the distillation column and pressurized to 0.25 MPa in a nitrogen stream. The external temperature of the distillation column was set at 140° C., while the temperature of the bottom of the reaction tank was set at 250° C., and the temperature of the heat transfer medium was increased from 220° C. to 250° C. over 30 minutes. Thereafter, the mixture was subjected to esterification reaction at a heat transfer medium temperature of 250° C. at a pressure of 0.25 MPa with stirring at 60 r.p.m., during which water formed was distilled away from the system through the distillation column. A stage at which the internal temperature of the distillation column exceeded 100° C. was regarded as an esterification reaction starting point, and 101 minutes after that stage, a stage at which the internal temperature of the distillation column came to be lower than 120° C. was regarded as a reaction terminating point. After the reaction was finished, the pressure in the reaction tank was gradually released and returned to atmospheric pressure. Subsequently, the above solution of aluminum acetylacetonate in ethylene glycol was added as a polycondensation catalyst in an amount of 0.012 mol-% in terms of aluminum atom relative to the acid component in the polyester and the above solution of Irganox 1425 (Ciba Specialty Chemicals Inc.) in ethylene glycol in an amount of 0.018 mol-% in terms of Irganox 1425 under stirring at 60 r.p.m. Thereafter, the mixture was stirred at a stirring rate of 60 r.p.m. for 15 minutes at a heat transfer medium temperature of 250° C. in a nitrogen atmosphere at normal pressure. Thereafter, the nitrogen line was closed, and the temperature of the bottom of the reaction tank was set at 275° C., and the temperature of the heat transfer medium was increased from 250° C. to 275° C. over 70 minutes during which the pressure in the reaction tank was gradually reduced with a vacuum pump. In this pressure reduction, the pressure was reduced from normal pressure to 40000 Pa for the first 20 minutes, then to 20000 Pa for 10 minutes, then to 6650 Pa for 10 minutes, then to 2650 Pa for 10 minutes, and to 133 Pa for the last 20 minutes. During this step, the reaction mixture was stirred at 60 r.p.m. Ethylene glycol formed was distilled away from the system through the distillation column. At a stage where the temperature of the heat transfer medium reached 275° C. and the degree of vacuum in the tank reached 133 Pa, the vacuum line was completely opened. This stage was regarded as a polycondensation reaction initiating point. The degree of vacuum at this stage was 26.6 Pa. Thereafter, the polycondensation reaction was carried out at a heat transfer medium temperature of 275° C. at a stirring rate of 60 r.p.m. while ethylene glycol formed was distilled away from the system through the distillation column. When the stirring torque reached a predetermined level, the stirring rate was gradually reduced from 60 r.p.m. to 40 r.p.m. while the stirring torque was maintained. As the reaction proceeded, the degree of vacuum in the tank was gradually increased to 13.3 Pa or less finally at a polycondensation reaction terminating point. The polycondensation reaction was finished when 40 r.p.m. was reached under predetermined stirring torque. The time required for the polycondensation reaction was 73 minutes. Thereafter, stirring was terminated, the vacuum line was closed, and while the temperature of the heat transfer medium was kept at 275° C., nitrogen was introduced gradually into the reaction tank so that the inside of the tank was returned to normal pressure. Thereafter, the melt polymer was extruded in a strand form in cold water at a pressure of about 0.1 MPa through discharge nozzles in a lower part of the reaction tank, rapidly cooled with the water and cut by a cutter into cylindrical resin chips having a length of about 3 mm and a diameter of about 2 mm. The retention time in cold water was about 20 seconds. The IV of the resulting PET was 0.63 dl/g, the Tm was 256° C., the L value was 70.9, the a value was −2.9, and the b value was 4.4.

Example 30

To a mixture of bis(2-hydroxyethyl)terephthalate and oligomers produced in a usual manner from high-purity terephthalic acid and ethylene glycol in a 15-L stainless steel autoclave equipped with a stirrer were added 2.5 g/l aluminum trisacetylacetonate solution as a polymerization catalyst in ethylene glycol in an amount of 0.014 mol-% in terms of aluminum atom relative to the acid component in the polyester and 10 g/l Irganox 1425 (Ciba Specialty Chemicals Inc.) in ethylene glycol in an amount of 0.01 mol-% in terms of Irganox 1425 relative to the acid component in the polyester, and further 10 g/l cobalt acetate.4H$_2$O solution as a color tone improver in ethylene glycol in an amount of 3 ppm in terms of cobalt atom relative to the polymer to be finally obtained, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa. The polycondensation time required for the IV of the polyethylene terephthalate to reach about 0.65 dl/g was 80 minutes. The polyethylene terephthalate having an intrinsic viscosity of about 0.65 dl/g obtained by the polycondensation reaction was chipped in a usual manner. The PET resin chips was very excellent with a b value of 0.9.

Example 31

Polyester was polymerized in the same manner as in Example 30 except that 2.5 g/l aluminum trisacetylacetonate solution as a polycondensation catalyst in ethylene glycol in an amount of 0.014 mol-% in terms of aluminum atom relative to the acid component in the polyester, 10 g/l Irganox 1425 solution in ethylene glycol in an amount of 0.01 mol-% in terms of Irganox 1425 relative to the acid component in the polyester, 50 g/l lithium acetate.2H$_2$O solution in ethylene glycol in an amount of 0.01 mol-% in terms of lithium atom relative to the acid component, and Sandoplast blue 2B (Clariant) as a color tone improver in an amount of 1 ppm relative to the polymer to be finally obtained. The polycondensation time required for the IV of the polyethylene terephthalate to reach about 0.65 dl/g was 70 minutes, and the resulting polymer was excellent with a b value of −0.1.

Comparative Example 4

The same procedure as in Example 30 was repeated except that antimony trioxide was used as a polycondensation catalyst in an amount of 0.05 mol-% in terms of antimony atom relative to the acid component in PET. The polycondensation time required for the IV of the polyethylene terephthalate to reach about 0.65 dl/g was 120 minutes, and the b value of the resulting polymer was 2.6.

Example 32

A stainless steel autoclave equipped with a stirrer was charged with high-purity terephthalic acid and ethylene glycol in the molar ratio of 1:2, and triethylamine was added in an amount of 0.3 mol-% relative to the acid component, and 23.5 wt-% titanium dioxide slurry in ethylene glycol was added in an amount of 0.35 wt-% in terms of titanium dioxide relative to the polyester to be finally obtained, and the mixture was subjected to esterification reaction at a pressure of 0.25 MPa at 250° C. while water was distilled away from the system, whereby a BHET mixture was obtained. To this BHET mixture were added 3 g/l aluminum trisacetylacetonate solution in ethylene glycol in an amount of 0.010 mol-% in terms of aluminum atom relative to the acid component in the polyester, 100 g/l Irganox 1425 solution (Ciba Specialty Chemicals Inc.) in ethylene glycol in an amount of 0.015 mol-% in terms of Irganox 1425 relative to the acid component in the polyester and HOSTALUX KS (Clariant) in an amount of 50 ppm relative to the polymer to be finally obtained, and the mixture was stirred at 250° C. for 15 minutes in a nitrogen atmosphere at normal pressure. Then, the temperature was increased to 280° C. over 60 minutes while the pressure in the reaction system was gradually reduced to 13.3 Pa (0.1 Torr), and the polycondensation reaction was further conducted at 280° C. at 13.3 Pa. The polycondensation reaction was carried out for 80 minutes, whereby PET having an IV of 0.67 dl/g was obtained. The AV of the resulting PET was 6 equivalents/ton, the Tm was 255° C., the L value was 85.3, the a value was 0.0, and the b value was 2.1.

Example 33

A stainless steel autoclave equipped with a stirrer was charged with high-purity terephthalic acid and ethylene glycol in the molar ratio of 1:2, and triethylamine was added in an amount of 0.3 mol-% relative to the acid component, and esterification reaction was carried out in the same manner as in Example 30, whereby a BHET mixture was obtained. To this BHET mixture were added 3 g/l aluminum trisacetylacetonate solution in ethylene glycol in an amount of 0.010 mol-% in terms of aluminum atom relative to the acid component in the polyester, 100 g/l Irganox 1425 solution (Ciba Specialty Chemicals Inc.) in ethylene glycol in an amount of 0.015 mol-% in terms of Irganox 1425 relative to the acid component in the polyester and HOSTALUX KS (Clariant) in an amount of 250 ppm relative to the polymer to be finally obtained, and polymerization of PET was carried out in the same manner as in Example 30. The polycondensation reaction was carried out for 95 minutes, whereby PET having an IV of 0.66 dl/g was obtained. The AV of the resulting PET was not higher than 1 equivalent/ton, the Tm was 256° C., the L value was 71.1, the a value was −1.0, and the b value was 2.9.

Examples 34 to 39

To a mixture of bis(2-hydroxyethyl)terephthalate and oligomers produced in a usual manner from high-purity terephthalic acid and ethylene glycol were added 2.5 g/l aluminum trisacetylacetonate in ethylene glycol in an amount of 0.014 mol-% relative to the acid component in the polyester and 100 g/l Irganox 1425 in ethylene glycol in an amount of 0.01 mol-% in terms of Irganox 1425 relative to the acid component, and further a color tone improver shown in Table 6 was added, and the mixture was stirred at 250° C. for 15 minutes in a nitrogen atmosphere at normal pressure. Then, the temperature was increased to 280° C. over 40 minutes while the pressure in the reaction system was gradually reduced to 133 Pa or less, and the polycondensation reaction was further conducted at 280° C. at 13.3 Pa or less, whereby PET having an IV of about 0.64 dl/g was polymerized. The amount of the color tone improver added was 0.3 ppm relative to the polymer to be finally obtained. The color tone improver was added as slurry at a concentration of 1 g/kg in ethylene glycol. The examination results of the color tone of the resulting PET are shown in Table 6. The color tone improvers used in Examples 37 to 39 are those containing a dispersant.

Example 40

<Spinning Example 1 of Polyester>
A stainless steel autoclave equipped with a stirrer was charged with high-purity terephthalic acid and ethylene glycol in the molar ratio of 1:2, and triethylamine was added in an amount of 0.3 mol-% relative to the acid component, and 23.5 wt-% titanium dioxide slurry in ethylene glycol was added in an amount of 0.35 wt-% in terms of titanium dioxide relative to the polyester, and the mixture was subjected to esterification reaction at a pressure of 0.25 MPa at 260° C. while water was distilled away from the system, whereby a BHET mixture was obtained. To this BHET mixture were added 2.5 g/l aluminum trisacetylacetonate as a polycondensation catalyst in ethylene glycol in an amount of 0.01 mol-% in terms of aluminum atom relative to the acid component in the polyester and 100 g/l Irganox 1425 solution in ethylene glycol in an amount of 0.015 mol-% in terms of Irganox 1425 relative to the acid component, and the mixture was stirred at 250° C. for 15 minutes in a nitrogen atmosphere at normal pressure. Then, the temperature was increased to 280° C. over 70 minutes while the pressure in the reaction system was gradually reduced to 266 Pa (2 Torr), and the polycondensation reaction was further conducted at 280° C. at 266 Pa. The polycondensation reaction was carried out for 60 minutes, and the resulting PET was chipped in a usual manner. The IV of the resulting PET was 0.61 dl/g, the AV was 11 equivalents/ton, the L value was 83.8, the a value was −2.2, and the b value was 8.5.

The resultant PET resin chips were dried, fed to a melt extruder, discharged at 275° C. through a spinneret having 24 orifices with a bore diameter of 0.14 mmϕ, cooled in a usual manner, subjected to oiling and drawn at a rate of 1000 m/min. The rate of discharge was 17 g/min. Subsequently, 3 strands were combined, stretched 3.58-fold at a preheating roller temperature of 80° C. and at a setting temperature of 150° C. to give a drawn polyester yarn of 142 decitex with 72 filaments. The operativeness in spinning and drawing was very good, and the physical characteristics of the resultant yarn were not problematic for use in clothing. Physical properties of the drawn yarn are shown in Table 7.

The resulting yarn was interweaved with a machine at mesh density of 4.5 at Feed 6. Further, it was refined, dried and preset. After refining, L* was 93.5, a* was −0.9, b* was 3.0, and the sample showed higher yellow discoloration than that produced with the antimony catalyst in the Comparative Examples, but a visible difference therebetween could be hardly recognized. The degree of absorption of dyes and light-fastness were almost similar to those of the product with the antimony catalyst.

Example 41

<Spinning Example 2 of Polyester>
PET was polymerized in the same manner as in Example 40 except that 20 g/l cobalt (II) acetate.4H$_2$O solution in ethylene glycol was added as a color tone improver in an amount of 3 ppm in terms of cobalt atom relative to the polyester. The time necessary for the polycondensation reaction was 60 minutes. The IV of the resulting PET resin chips was 0.61 dl/g, the AV was 11 equivalents/ton, the L value was 82.2, the a value was −1.9, and the b value was 6.4.

The resultant PET resin chips were dried, spun and drawn in the same manner as in Example 40. However, the rate of discharge was 20 g/min. The strands were stretched 3.44-fold to give an oriented polyester yarn of 174 decitex with 72 filaments. The operativeness in spinning and drawing was very good, and the physical characteristics of the resultant yarn were not problematic for use in clothing. The physical properties etc. of the drawn yarn are shown in Table 7.

The resulting yarn was interweaved with a machine, refined, dried and preset in the same manner as in Example 40. After refining, L* was 92.9, a* was −0.7, b* was 2.7, and the sample indicated almost the same measurement result as that of the product with the antimony catalyst in the Comparative Examples, and a visible difference therebetween could be hardly recognized. The degree of absorption of dyes and light-fastness were almost similar to those of the product with the antimony catalyst.

Comparative Example 5

<Spinning Comparative Example of Polyester>
PET was polymerized in the same manner as in Example 40 except that antimony trioxide was added as a polycondensation catalyst in an amount of 0.04 mol-% in terms of antimony atom relative to the acid component in the polyester. The time necessary for the polycondensation reaction was 74 minutes. The IV of the resulting PET resin chips was 0.63 dl/g, the AV was 6 equivalents/ton, the L value was 81.0, the a value was −1.9, and the b value was 6.2.

The resultant PET resin chips were dried, spun and drawn in the same manner as in Example 40. However, the rate of discharge was 19 g/min. The strands were stretched 3.42-fold to give a polyester drawn yarn of 174 decitex with 72 filaments. The physical properties etc. of the drawn yarn are shown in Table 7. The resulting yarns were interweaved with a machine, refined, dried and preset in the same manner as in Example 40. After refining, L* was 92.2, a* as −0.6, and b* was 2.4.

Example 42

<Spinning Example 3 of Polyester>
A polymerization device equipped with a stirrer, a distillation column and a pressure regulator was charged with 164 parts of high-purity terephthalic acid and 115 parts of ethylene glycol, and a phosphorus compound represented by the chemical formula below (chemical formula 3) was added such that phosphorus atoms were contained at a level of 6000 ppm in the polyester to be finally obtained. Then, 0.7 part of triethylamine was added, and titanium dioxide was added so as to be contained in an amount of 0.35 wt-% relative to the polyester to be finally obtained, and the mixture was subjected to esterification reaction at a pressure of 0.25 MPa at 240° C. while water formed was successively removed. After esterification, 2.5 g/l aluminum acetylacetonate in ethylene glycol was added as a catalyst in an amount of 0.011 mol-% in terms of aluminum atom relative to the acid component in the polyester and 100 g/l Irganox 1425 solution in ethylene glycol in an amount of 0.01 mol-% in terms of Irganox 1425 relative to the acid component in the polyester, and the mixture was stirred at 240° C. for 20 minutes in a nitrogen atmosphere at normal pressure. Then, the temperature was increased to 280° C. over 75 minutes while the pressure in the reaction system was gradually reduced to 665 Pa or less, and the polycondensation reaction was further conducted at 280° C. at 665 Pa or less. The polyethylene terephthalate having an intrinsic viscosity of 0.60 dl/g obtained by the polycondensation reaction was chipped in a usual manner. The resin chips had an AV of 13 equivalents/ton and a Tm of 245° C. (formula 3)

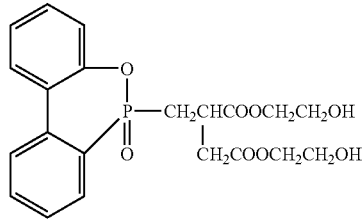

(formula 3)

The PET resin chips were dried, fed to a melt extruder, discharged at 261° C. through a spinneret having 108 orifices with a bore diameter of 0.14 mmφ, cooled, solidified, drawn at a spinning rate of 2400 m/min., and without rolling, drawn 1.625-fold between a preheating roller heated at 80° C. and a setting roller heated at 150° C. to give a completed polyester yarn of about 96 decitex with 216 filaments. In spinning, the number of times strands were cut every 8 nozzles was less than 1.0 per day, and no insoluble particle was recognized around the orifices for 4 days. The operativeness of spinning was significantly superior as compared with spinning of copolymerized polyethylene terephthalate produced with the antimony catalyst. Further, the physical characteristics etc. of the resultant yarn were not problematic for use in clothing.

Example 43

<Spinning Example 4 of Polyester)
A stainless steel autoclave equipped with a stirrer was charged with high-purity terephthalic acid (acid component accounting for 99 mol-% of the total acid component), 5-sodium sulfoisophthalic acid ethylene glycol ester (acid component accounting for 1 mol-%) and ethylene glycol (200 mol-% relative to the acid component), and sodium acetate was added in an amount of 0.2 mol-% in terms of sodium atom relative to the acid component in the polyester, triethylamine in an amount of 0.1 mol-% relative to the acid component in the polyester and titanium dioxide in an amount of 0.35 wt-% relative to the polyester to be finally obtained, and the mixture was subjected to esterification reaction for 2 hours at a pressure of 0.25 MPa at 260° C. while water formed was successively removed. After esterification, 4.5 mol-% neopentyl glycol-ethylene oxide adduct (2 mol-% relative to the glycol component in the polyester) was added, and 13 g/l aluminum chloride in ethylene glycol was added as a polycondensation catalyst in an amount of 20 ppm in terms of aluminum atom relative to the finally obtained polyester and 5 g/l Irganox 1222 solution in ethylene glycol in an amount of 0.04 mol-% in terms of Irganox 1222 relative to the acid component in the polyester, and the mixture was stirred at 250° C. for 15 minutes in a nitrogen atmosphere at normal pressure. Then, the temperature was increased to 275° C. over 80 minutes while the pressure in the reaction system was gradually reduced to 39.9 Pa (0.3 Torr), and the polycondensation reaction was further conducted at 275° C. at 39.9 Pa. The polyethylene terephthalate having an intrinsic viscosity of 0.60 dl/g obtained by the polycondensation reaction for 52 minutes was chipped in a usual manner. The resin chips had an AV of 9 equivalents/ton and a Tm of 245° C.

The resultant PET resin chips were dried, fed to a melt extruder, discharged at 270° C. through a spinneret, cooled in a usual manner, subjected to oiling and drawn at a rate of 1500 m/min. Subsequently, the strands were drawn 2.3-fold on a preheating roller at 80° C. and at a setting temperature of 150° C. to give a polyester yarn. The operativeness in spinning and drawing was very good, and the physical characteristics etc. of the resultant yarn were not problematic for use in clothing.

Example 44

Example 1 of Bottle

A polymerization device equipped with a stirrer, a distillation column and a pressure regulator was charged with high-purity terephthalic acid (acid component accounting for 98.4 mol-% of the total acid component), isophthalic acid (acid component accounting for 1.6 mol-%) and ethylene glycol (200 mol-% relative to the acid component), and triethylamine was added in an amount of 0.3 mol-% relative to the acid component, and the mixture was subjected to esterification reaction at a pressure of 0.25 MPa at 245° C. while water was successively removed, whereby a BHET mixture having a degree of esterification of 95% or more was obtained. To this BHET mixture was added 100 g/l Irganox 1425 solution in ethylene glycol in an amount of 0.025 mol-% in terms of Irganox 1425 relative to the acid component in the polyester, and 20 g/l cobalt (II) acetate.4H$_2$O solution in ethylene glycol was added in an amount of 5 ppm in terms of cobalt atom relative to the polyester, and the mixture was stirred at 245° C. for 10 minutes in a nitrogen atmosphere at normal pressure. Then, 3 g/l aluminum trisacetylacetonate solution in ethylene glycol was added in an amount of 0.014 mol-% in terms of aluminum atom relative to the acid component in the polyester, and the mixture was stirred at 245° C. for 10 minutes in a nitrogen atmosphere at normal pressure. Then, the temperature was increased to 275° C. over 75 minutes while the pressure in the reaction system was gradually reduced to 133 Pa or less, and the polycondensation reaction was further conducted at 275° C. at 133 Pa or less. After the polycondensation reaction for about 80 minutes, the polyethylene terephthalate was chipped in a usual manner. The resulting polyester resin chips had an intrinsic viscosity of 0.63 dl/g, an AV of 3 equivalents/ton and a Tm of 252° C.

The resin chips were subjected to precrystallization at 160° C. and solid state polymerization, to give resin chips having an IV of 0.78 dl/g.

Then, the resin chips were dried in an oven using dry nitrogen and molded into a preform by an injection molding machine M-150C (DM) (Meiki Seisakusho) at a cylinder temperature of 280° C. and at a mold temperature of 25° C. This preform was heated again to 100° C. and subjected to biaxial blow molding at a blow pressure of 30 kg/cm$^2$ in a mold at 30° C. in a blow molding machine LB-01E (Corpoplast Co., Ltd.), to give a 1500 cc hollow molded article. The L value of the resulting hollow molded article was 89.3, the a value was 0.1, and the b value was 1.0, and the molded article was visually excellent to the same degree as that of the product by the antimony catalyst in the Comparative Examples. The resulting hollow molded article was also excellent in transparency.

Example 45

Example 2 of Bottle

A polymerization device equipped with a stirrer, a distillation column and a pressure regulator was charged with high-purity terephthalic acid (acid component accounting for 98.4 mol-% of the total acid component), isophthalic acid (acid component accounting for 1.6 mol-%) and ethylene glycol (200 mol-% relative to the acid component), and triethylamine was added in an amount of 0.3 mol-% relative to the acid component, and 8 g/l Irganox 1222 solution in ethylene glycol in an amount of 0.03 mol-% in terms of Irganox 1222 relative to the acid component in the polyester, and the mixture was subjected to esterification reaction at a pressure of 0.25 MPa at 245° C. while water was successively removed, whereby a BHET mixture having a degree of esterification of 95% or more was obtained. To this BHET mixture were added 3 g/l aluminum trisacetylacetonate in ethylene glycol in an amount of 0.014 mol-% in terms of aluminum atom relative to the acid component in the polyester, 100 g/l magnesium acetate.4$H_2$O in ethylene glycol in an amount of 0.01 mol-% in terms of magnesium atom relative to the acid component and 20 g/l cobalt (II) acetate.4$H_2$O in ethylene glycol in an amount of 5 ppm in terms of cobalt atom relative to the polyester, and the mixture was stirred at 245° C. for 10 minutes in a nitrogen atmosphere at normal pressure. Then, the temperature was increased to 275° C. over 75 minutes while the pressure in the reaction system was gradually reduced to 133 Pa or less, and the polycondensation reaction was further conducted at 275° C. at 133 Pa or less. After the polycondensation reaction for about 100 minutes, the polyester was chipped in a usual manner. The resulting polyester resin chips had an IV of 0.63 dl/g, an AV of 6 equivalents/ton and a Tm of 251° C.

The resin chips were subjected to precrystallization and solid state polymerization in the same manner as in Example 44, to give resin chips having an IV of 0.81 dl/g. The resin chips were used to form a hollow molded article in the same manner as in Example 44. The L value of the resulting hollow molded article was 89.4, the a value was 0.2, and the b value was 1.2, and the molded article was visually excellent to the same degree as that of the product by the antimony catalyst in the Comparative Examples. The resulting hollow molded article was also excellent in transparency.

Example 46

Example 3 of Bottle 20 g/l aqueous basic aluminum acetate solution (hydroxy aluminum diacetate, manufactured by ALDRICH) was prepared at about 70° C. Ethylene glycol was added to this aqueous solution in the ratio of 2:1 (ratio by volume) to give a catalyst solution.

Polyester was polymerized in the same manner as in Example 44 except that in place of aluminum trisacetylacetonate, the above basic aluminum acetate solution was added as a polycondensation catalyst in an amount of 0.014 mol-% in terms of aluminum atom relative to the acid component in the polyester. The polycondensation reaction was carried out for about 90 minutes. The resulting polyester resin chips had an IV of 0.63 dl/g, an AV of 6 equivalents/ton, and a Tm of 252° C.

The resin chips were subjected to precrystallization and solid state polymerization in the same manner as in Example 44, to give resin chips having an IV of 0.79 dl/g. The resin chips were used to form a hollow molded article in the same manner as in Example 44. The L value of the resulting hollow molded article was 89.5, the a value was 0.1, and the b value was 1.0, and the molded article was visually excellent to the same degree as that of the product by the antimony catalyst in the Comparative Examples. The resulting hollow molded article was also excellent in transparency.

Comparative Example 6

Comparative Example 1 of Bottle

Polyester was polymerized in the same manner as in Example B1 except that antimony trioxide was added as a polycondensation catalyst in an amount of 200 ppm in terms of antimony atom relative to the resulting polyester, and cobalt (II) acetate.4$H_2$O was added as an additive in an amount of 10 ppm in terms of cobalt atom relative to the polyester and phosphoric acid as an additive in an amount of 30 ppm in terms of phosphorus atom relative to the polyester. The polycondensation reaction was carried out for about 80 minutes. The resulting polyester resin chips had an IV of 0.65 dl/g, an AV of 2 equivalents/ton, and a Tm of 252° C.

The resin chips were subjected to precrystallization and solid state polymerization in the same manner as in Example 44, to give resin chips having an IV of 0.79 dl/g. The resin chips were used to form a hollow molded article in the same manner as in Example B1. The L value of the resulting hollow molded article was 88.3, the a value was 0.5, and the b value was 1.1.

Example 47

Example 1 of Resin Plate

High-purity terephthalic acid (acid component accounting for 98.4 mol-% of the total acid component), isophthalic acid (acid component accounting for 1.6 mol-%) and ethylene glycol (200 mol-% based on the acid component) were charged, and triethylamine was added in an amount of 0.3 mol-% relative to the acid component, and the mixture was subjected to esterification reaction at a pressure of 0.25 MPa at 245° C. while water was distilled away from the system, whereby a BHET mixture having a degree of esterification of 95% or more was obtained. To this BHET mixture were added 3 g/l aluminum trisacetylacetonate solution as a polycondensation catalyst in ethylene glycol in an amount of 0.008 mol-% in terms of aluminum atom relative to the acid component in the polyester and 100 g/l Irganox 1425 (Ciba Specialty Chemicals Inc.) in ethylene glycol in an amount of 0.012 mol-% in terms of Irganox 1425 relative to the acid component in the polyester, and further 100 g/l magnesium acetate.4$H_2$O in ethylene glycol was added in an amount of 0.01 mol-% in terms of magnesium atom relative to the acid component, and the mixture was stirred at 245° C. for 10 minutes in a nitrogen atmosphere at normal pressure. Then, the temperature was increased to 285° C. over 75 minutes while the pressure in the reaction system was gradually reduced to 133 Pa or less, and the polycondensation reaction was further conducted at 285° C. at 133 Pa or less, whereby polyester resin chips having an IV of 0.64 dl/g were obtained.

The resin chips were preliminarily crystallized at 160° C. and then subjected to solid state polymerization at 200° C., to give resin chips having an IV of 0.80 dl/g.

The resin chips were dried and then molded into a stepped plate molded article by an injection molding machine M-150C (DM) (manufactured by Meiki Seisakusho) with a cylinder temperature of 290° C. The resultant stepped molded plate had about 3 cm×about 5 cm stepped plates of 2, 3, 4, 5, 6, 7, 8, 9, 10 and 11 mm in thickness, each weighing about 146 g. The plate of 4 mm in thickness was used in measurement of haze (haze %). The resultant stepped plate molded article had a haze of 2% and an aldehyde content of 18 ppm, both of which were excellent.

Example 48

Example 2 of Resin Plate

A stepped plate molded article was obtained in the same manner as in Example 47 except that 3 g/l aluminum trisacetylacetonate solution in ethylene glycol was added as a polycondensation catalyst in an amount of 0.008 mol-% in terms of aluminum atom relative to the acid component in the polyester, 100 g/l Irganox 1425 (Ciba Specialty Chemicals Inc.) in ethylene glycol was added in an amount of 0.012 mol-% in terms of Irganox 1425 relative to the acid component in the polyester, and further 50 g/l sodium acetate in ethylene glycol was added in an amount of 0.01 mol-% in terms of sodium atom relative to the acid component. The haze of the resultant stepped plate molded article was as relatively high as 8%, but the content of aldehyde was very good (16 ppm).

Example 49

Example 3 of Resin Plate

A stepped plate molded article was obtained in the same manner as in Example 47 except that 3 g/l aluminum trisacetylacetonate solution in ethylene glycol was added as a polycondensation catalyst in an amount of 0.008 mol-% in terms of aluminum atom relative to the acid component in the polyester, 100 g/l Irganox 1425 (Ciba Specialty Chemicals Inc.) in ethylene glycol was added in an amount of 0.02 mol-% in terms of Irganox 1425 relative to the acid component in the polyester, and further 50 g/l sodium acetate in ethylene glycol was added in an amount of 0.01 mol-% in terms of sodium atom relative to the acid component. The haze of the resultant stepped plate molded article was 2%, and the content of aldehyde was 19 ppm, both of which were excellent.

Example 50

Example 1 of Film

A polymerization device equipped with a stirrer, a distillation column and a pressure regulator was charged with high-purity terephthalic acid and ethylene glycol in the molar ratio of 1:2, and triethylamine was added in an amount of 0.3 mol-% relative to the acid component, and the mixture was subjected to esterification reaction at a pressure of 0.25 MPa at 240° C. while water formed was successively removed. After esterification, 2.5 g/l aluminum acetylacetonate in ethylene glycol was added as a catalyst in an amount of 0.011 mol-% in terms of aluminum atom relative to the acid component in the polyester and 100 g/l Irganox 1425 (Ciba Specialty Chemicals Inc.) in ethylene glycol in an amount of 0.01 mol-% in terms of Irganox 1425 relative to the acid component in the polyester, and the mixture was stirred at 240° C. for 20 minutes in a nitrogen atmosphere at normal pressure. Then, the temperature was increased to 280° C. over 75 minutes while the pressure in the reaction system was gradually reduced to 665 Pa or less, and the polycondensation reaction was further conducted at 280° C. at 665 Pa or less. The polyethylene terephthalate having an intrinsic viscosity of 0.66 dl/g obtained by the polycondensation reaction was chipped in a usual manner. The resin chips had an AV of 11 equivalents/ton and a Tm of 256° C.

The PET resin chips thus obtained were vacuum-dried at 120° C. for 24 hours. The PET resin chips were quantitatively fed to an extruder and melt-extruded into a sheet at about 280° C., quenched and solidified on a metal roll kept at a surface temperature of about 20° C., to give a cast film of 860 μm in thickness.

Then, this cast film was heated to about 95° C. with a series of heated rollers and an infrared heater and then drawn 3.4-fold in the longer direction with a series of rollers different in circumferential velocity to give a monoaxial oriented PET film. Subsequently, the film was drawn 3.8-fold in the width direction by a tender at about 120° C., and while the width length of the film was fixed, the film was heated at 225° C. for 4 seconds, followed by relaxation by 5% at 200° C. for about 4 seconds, to give a biaxial oriented PET film of 70 μm in thickness. The resulting film was cut into strips in the lengthwise direction and cross direction respectively and measured for strength and elongation. The strength was 23.6 kg/mm$^2$ in the lengthwise direction and 26.9 kg/mm$^2$ in the cross direction, and the elongation was 162% in the lengthwise direction and 109% in the cross direction, which were almost similar to those of a film prepared in the same manner by using the antimony catalyst. In respect of transparency, refractive index and thermal shrinkage, the resulting film was almost comparative to a film prepared in the same manner by using the antimony catalyst.

Example 51

Example 2 of Film

A film was prepared in the same manner as in Example 50 except that when the PET resin chips polymerized in Example 50 were used to form a film, PET resin chips polymerized with cobalt acetate as a catalyst were simultaneously fed to the extruder. The resin chips were mixed in such a ratio that 1.5 ppm cobalt atom was contained in the polyester film to be finally obtained. The resulting film was excellent in color tone with yellow discoloration reduced.

Example 52

Example 3 of Film

A polymerization device equipped with a stirrer, a distillation column and a pressure regulator was charged with 86.5 kg high-purity terephthalic acid and ethylene glycol in the molar ratio of 1:2, 52.96 g magnesium acetate and 3.57 g sodium acetate, and triethylamine was added in an amount of 0.3 mol-% relative to the acid component, and the mixture was subjected to esterification reaction for 130 minutes at a pressure of 0.20 MPa at 240° C. while water was successively removed, whereby a BHET mixture having a degree of esterification of 95% or more was obtained. To this BHET mixture was added 50 g/l triethyl phosphonoacetate in ethylene glycol in an amount of 0.0095 mol-% in terms of triethyl phosphonoacetate relative to the acid component, and the mixture was stirred at 240° C. for 10 minutes in a nitrogen atmosphere at normal pressure. Then, 100 g/l Irganox 1425 in ethylene glycol was added in an amount of 0.012 mol-% in terms of Irganox 1425 relative to the acid component, and 2.5 g/l aluminum acetylacetonate in ethylene glycol was added in an amount of 0.008 mol-% in terms of aluminum atom relative to the acid component in the polyester, and the mixture was stirred at 240° C. for 10 minutes in a nitrogen atmosphere at normal pressure. Then, the temperature was increased to 275° C. over 75 minutes while the pressure in the reaction system was gradually reduced to 13.3 Pa (0.1 Torr), and the polycondensation reaction was further conducted at 275° C. at 13.3 Pa. The melt polymer was extruded through discharge nozzles into water and cut by a cutter into cylindrical chips having a diameter of about 3 mm and a length of about 5 mm. The intrinsic viscosity of the resulting polymer was 0.61 dl/g, and the polymerization time necessary for obtaining this intrinsic viscosity was 108 minutes, and the AV was 15 equivalents/ton, the Tc1 was 161° C., the Tm was 256° C., the Tc2 was 180° C., the L value was 63.5, the a value was −2.4, the b value was 4.7, the ρi was $0.162 \times 10^8$ Ω·cm, and the TS was 0.24. The PET is excellent in polymer physical properties and ρi, and in film making, the resin can be used to produce a stable film.

Example 53

Example 4 of Film

A polymerization device equipped with a stirrer, a distillation column and a pressure regulator was charged with 86.5 kg high-purity terephthalic acid and ethylene glycol in the molar ratio of 1:2, 52.96 g magnesium acetate, 3.57 g sodium acetate and Irganox 1222 in an amount of 0.02 mol-% in terms of Irganox 1222 relative to the acid component, and triethylamine was added in an amount of 0.3 mol-% relative to the acid component, and the mixture was subjected to esterification reaction for 130 minutes at a pressure of 0.20 MPa at 240° C. while water was successively removed, whereby a BHET mixture having a degree of esterification of 95% or more was obtained. To this BHET mixture were added 50 g/l triethyl phosphonoacetate in ethylene glycol in an amount of 0.0095 mol-% in terms of triethyl phosphonoacetate relative to the acid component, and the mixture was stirred at 240° C. for 10 minutes in a nitrogen atmosphere at normal pressure. Thereafter, 2.5 g/l aluminum acetylacetonate in ethylene glycol was added in an amount of 0.01 mol-% in terms of aluminum atom relative to the acid component in the polyester, and the mixture was stirred at 240° C. for 10 minutes in a nitrogen atmosphere at normal pressure. Then, the temperature was increased to 275° C. over 100 minutes while the pressure in the reaction system was gradually reduced to 13.3 Pa (0.1 Torr), and the polycondensation reaction was further conducted at 275° C. at 13.3 Pa. The melt polymer was extruded through discharge nozzles into water and cut by a cutter into cylindrical chips having a diameter of about 3 mm and a length of about 5 mm. The intrinsic viscosity of the resulting polymer was 0.61 dl/g, and the polymerization time necessary for obtaining this intrinsic viscosity was 95 minutes, and the AV was 12.6 equivalents/ton, the Tc1 was 160° C., the Tm was 256° C., the Tc2 was 183° C., the L value was 63.3, the a value was −2.7, the b value was 5.6, the ρi was $0.178 \times 10^8$ Ω·cm, and the Ts was 0.25. The PET is excellent in polymer physical properties and ρi, and in film making, the resin can be used to produce a stable film.

Example 54

Example 5 of Film

A electrical-wire heating 2-L stainless steel autoclave equipped with a stirrer was charged with high-purity terephthalic acid and ethylene glycol in the molar ratio of 1:2.2, and 50 g/l magnesium acetate in ethylene glycol was added in an amount of 0.047 mol-% in terms of magnesium atom relative to the acid component, 20 g/l sodium acetate in ethylene glycol in an amount of 0.0084 mol-% in terms of sodium atom relative to the acid component, 5 g/l Irganox 1222 in ethylene glycol in an amount of 0.035 mol-% in terms of Irganox 1222 relative to the acid component, and silica synthesized as inert particles by a wet process (average particle diameter determined by a laser method: 2.7 μm) in an amount of 0.207 weight-% relative to the weight of the polymer to be obtained, and the mixture was subjected to esterification reaction for 125 minutes at a pressure of 0.25 MPa at 250° C. while water was successively distilled away from the system, whereby a BHET mixture having a degree of esterification of 95% or more was obtained. After this BHET mixture was heated to 260° C. over 30 minutes, and 2.5 g/l aluminum acetylacetonate in ethylene glycol was added as a polycondensation catalyst in an amount of 0.01 mol-% in terms of aluminum atom relative to the acid component in the polyester, and the mixture was stirred at 260° C. for 10 minutes in a nitrogen atmosphere at normal pressure. Then, the temperature was increased to 285° C. over 30 minutes while the pressure in the reaction system was gradually reduced to 13.3 Pa (0.1 Torr), and the polycondensation reaction was further conducted at 285° C. at 13.3 Pa. The melt polymer was extruded through discharge nozzles into water and cut by a cutter into cylindrical chips having a diameter of about 3 mm and a length of about 5 mm. The intrinsic viscosity of the resulting polymer was 0.60 dl/g, and the polymerization time necessary for obtaining this intrinsic viscosity was 56 minutes, and the AV was 19.5 equivalents/ton, the L value was 64.5, the a value was −3.0, the b value was 5.9, and the ρi was $0.199 \times 10^8$ Ω·cm. The PET is excellent in polymer physical properties and ρi, and in film making, the resin can be used to produce a stable film.

Example 55

A stainless steel autoclave was charged with high-purity terephthalic acid, ethylene glycol in a molar ratio of 1.7 to the acid component, and 1,4-cyclohexane dimethanol in a molar ratio of 0.32 to the acid component, and the mixture was subjected to esterification reaction for 180 minutes at a pressure of 0.25 MPa at 240° C. while water formed was successively distilled away from the system, whereby an oligomer was obtained. To the oligomer were added aluminum trisacetylacetonate solution in an amount of 120 ppm relative to the polymer to be finally obtained and Irganox 1425 in an amount of 190 ppm relative to the polymer to be finally obtained, and the mixture was stirred in a nitrogen atmosphere at normal pressure, and then the temperature was increased to 280° C. over 75 minutes while the pressure in the reaction system was gradually reduced to about 160 Pa, and the polycondensation reaction was further conducted for about 60 minutes at 280° C. at about 160 Pa, to give PET copolymerized with 1,4-hexane dimethanol. The IV of the resulting polymer was 0.68 dl/g, the L value was 62.4, and the b value was 3.2.

Effect of the Invention

According to this invention, there is provided a novel polyester polymerization catalyst based on a component other than antimony or germanium compounds, which has excellent catalytic activity and gives polyester excellent in thermal stability, stability to thermal oxidation, and hydrolytic stability, as well as polyester produced by using the same and a process for producing polyester.

INDUSTRIAL APPLICABILITY

The polyester of this invention can be applied for example to fibers for clothing, interior and bedding fibers in curtains, carpets and futon cotton, fibers for industrial materials such as tire cords and ropes, various fabrics, knitting, nonwoven fabrics of short or long fibers, films such as packaging films, industrial films, optical films, films for magnetic tapes, photographic films, films for can laminates, films for capacitors, thermally shrinkable films, gas barrier films, white films and easily cut films, hollow molded articles such as thermally unstable bottles, thermally stable bottles, direct blown bottles, gas barrier bottles, pressure-resistant bottles and heat- and pressure-resistant bottles, sheets such as A-PET and C-PET, and various molded articles of engineering plastics such as glass fiber-reinforced polyester and elastomer, and coatings and adhesives.

TABLE 1

| | Catalyst | | Polymerization time (min) | IV before test (dlg$^{-1}$) | AV (equivalent/ ton) | Physical properties of polyester | | | | | | | | | | |
|---|---|---|---|---|---|---|---|---|---|---|---|---|---|---|---|---|
| | Component | Amount (mol-%) | | | | L value | a value | b value | Tm (°C.) | Tc1 (°C.) | Tc2 (°C.) | DEG (mol %) | Haze (%) | TS | TOS | HS |
| Example 1 | Aluminum chloride | 0.015 | | | | | | | | | | | | | | |
| | Irganox 1425 | 0.02 | 75 | 0.65 | 1.4 | 68.47 | −2.73 | 5.32 | 258 | 141 | 186 | 2.1 | 0.1 | 0.17 | 0.01 or less | 0.05 |
| Example 2 | Aluminum chloride | 0.015 | | | | | | | | | | | | | | |
| | Irganox 1222 | 0.01 | | | | | | | | | | | | | | |
| | Lithium acetate · 2H$_2$O | 0.025 | 65 | 0.65 | 0.1 | 68.21 | −2.12 | 4.48 | 259 | 142 | 196 | — | — | 0.19 | 0.07 | 0.09 |
| Example 3 | Aluminum chloride | 0.015 | | | | | | | | | | | | | | |
| | Irganox 1425 | 0.01 | | | | | | | | | | | | | | |
| | Lithium acetate · 2H$_2$O | 0.01 | 66 | 0.65 | 4.1 | 69.3 | −2.77 | 5.41 | 259 | 141 | 184 | 2.1 | 0.1 | 0.21 | 0.01 | 0.07 |
| Comparative Example 1 | Aluminum chloride | 0.015 | 180 or more | — | — | — | — | — | — | — | — | — | — | — | — | — |
| Comparative Example 2 | Antimony trioxide | 0.05 | 65 | 0.65 | 4.4 | 55.03 | −0.29 | 1.06 | 257 | 131 | 209 | 2.2 | 0.5 | 0.22 | 0.01 or less | 0.05 |

TABLE 2

| | Catalyst | | Polymerization time (min) | IV (dlg$^{-1}$) | AV (equivalent · ton$^-$) | Physical properties of polyester | | | | |
|---|---|---|---|---|---|---|---|---|---|---|
| | Component | Amount (mol-%) | | | | L value | a value | b value | Tm (°C.) | Tc1 (°C.) | Tc2 (°C.) |
| Example 4 | Aluminum trisacetylacetonate | 0.014 | | | | | | | | | |
| | Irganox 1425 | 0.01 | 123 | 0.61 | 4 | 67.7 | −1.9 | 3.4 | 256 | 145 | 184 |
| Example 5 | Polyaluminum chloride | 0.014 | | | | | | | | | |
| | Irganox 1425 | 0.01 | 119 | 0.61 | 1 | 67.7 | −2.2 | 3.8 | 257 | 146 | 186 |
| Example 6 | Basic aluminum chloride | 0.014 | | | | | | | | | |
| | Irganox 1425 | 0.01 | 125 | 0.60 | <1 | 66.9 | −1.8 | 3.3 | 257 | 145 | 182 |
| Example 7 | Aluminum chloride · 6H$_2$O | 0.014 | | | | | | | | | |
| | Irganox 1425 | 0.01 | 121 | 0.60 | <1 | 66.8 | −1.9 | 3.4 | 256 | 147 | 181 |
| Example 8 | Polyaluminum chloride | 0.014 | | | | | | | | | |
| | Irganox 1222 | 0.03 | | | | | | | | | |
| | Magnesium acetate · 4H$_2$O | 0.01 | 123 | 0.60 | 1 | 66.2 | −1.3 | 2.1 | 256 | 145 | 186 |
| Comparative Example 3 | Antimony trioxide | 0.04 | 112 | 0.61 | <1 | 62.0 | −0.8 | 2.2 | 256 | 131 | 209 |

TABLE 3

| | Catalyst | | | | Physical properties of polyster | | | | | | | |
|---|---|---|---|---|---|---|---|---|---|---|---|---|
| | Component | Amount (mol-%) | Polymerization time (min) | IV (dlg$^{-1}$) | AV (equivalent · ton$^-$) | L value | a value | b value | Tm (° C.) | Tc1 (° C.) | Tc2 (° C.) |
| Example 9 | Basic aluminum acetate | 0.014 | | | | | | | | | |
| | Irganox 1425 | 0.01 | 132 | 0.61 | <1 | 64.9 | −1.7 | 3.7 | 256 | 147 | 182 |
| Example 10 | Basic aluminum acetate | 0.014 | | | | | | | | | |
| | Irganox 1425 | 0.01 | 133 | 0.60 | <1 | 66.6 | −2.2 | 4.0 | 256 | 143 | 184 |
| Example 11 | Aluminum lactate | 0.014 | | | | | | | | | |
| | Irganox 1425 | 0.01 | 124 | 0.60 | 3 | 66.5 | −2.1 | 4.4 | 256 | 148 | 185 |

TABLE 4

| | Aluminum compound | | Phosphorus compound | | Charging (molar fraction) EG/TPA | IV dl/g | AV$_0$ equivalent/ton | OHV o | Pn | Es (%) |
|---|---|---|---|---|---|---|---|---|---|---|
| | Amount (mol-%) | Form | Amount (mol-%) | Form | | | | | | |
| Example 17 | 0.008 | Solution | 0.012 | Solution | 2.0 | 0.06 | 362 | 4816 | 1.7 | 95.9 |
| Example 18 | 0.008 | Solution | 0.012 | Solution | 2.0 | 0.06 | 505 | 4517 | 1.8 | 94.4 |
| Example 19 | 0.008 | Solution | 0.012 | Solution | 2.0 | 0.06 | 939 | 4796 | 1.6 | 89.5 |
| Example 20 | 0.008 | Solution | 0.012 | Solution | 1.5 | 0.07 | 677 | 3492 | 2.2 | 92.7 |
| Example 21 | 0.006 | Solution | 0.01 | Solution | 2.0 | 0.06 | 510 | 4689 | 1.7 | 94.3 |
| Example 22 | 0.014 | Solution | 0.03 | Solution | 2.0 | 0.06 | 510 | 4689 | 1.7 | 94.3 |
| Example 23 | 0.014 | solution | 0.03 | Solution | 2.0 | ≦0.01 | — | — | — | — |
| Example 24 | 0.008 | slurry | 0.012 | Solution | 2.0 | 0.06 | 545 | 4508 | 1.8 | 93.9 |
| Example 25 | 0.008 | powder | 0.012 | Powder | 2.0 | 0.06 | 495 | 5012 | 1.6 | 94.4 |

TABLE 5

| | Polycondensation time (min) | IV (dl/g) | DEG (mol %) | L value | a value | b value |
|---|---|---|---|---|---|---|
| Example 17 | 120 | 0.637 | 2.28 | 67.95 | −2.44 | 3.75 |
| Example 18 | 108 | 0.629 | 2.12 | 69.72 | −1.96 | 2.87 |
| Example 19 | 117 | 0.626 | 1.87 | 69.33 | −2.00 | 2.65 |
| Example 20 | 134 | 0.633 | 2.07 | 70.23 | −2.07 | 3.44 |
| Example 21 | 130 | 0.608 | 2.34 | 69.53 | −1.59 | 2.55 |
| Example 22 | 180 | 0.410 | 2.19 | — | — | — |
| Example 23 | 160 | 0.600 | 2.43 | 64.52 | −1.32 | 1.82 |
| Example 24 | 117 | 0.630 | 2.29 | 69.54 | −2.01 | 2.68 |
| Example 25 | 120 | 0.628 | 2.35 | 69.8 | −2.05 | 2.88 |

TABLE 6

| Example | Color tone improver | Presence or absence of a dispersant | L value | a value | b value |
|---|---|---|---|---|---|
| 34 | phthalocyanine blue | absent | 68.6 | −4.5 | 2.8 |
| 35 | ultramarine | Absent | 69.4 | −2.6 | 4.2 |
| 36 | anthraquinone-based dye | Absent | 69.0 | −1.7 | 2.3 |
| 37 | ultramarine | Present | 70.2 | −2.0 | 3.8 |
| 38 | phthalocyanine-based pigment | Present | 69.3 | −4.6 | 2.5 |
| 39 | anthraquinone-based pigment | Present | 69.0 | −3.4 | 2.6 |

TABLE 7

| | Fineness (dtex) | Strength (cN/dtex) | Elongation (%) | Orientation (× 10⁻³) | Density (g/cm³) |
|---|---|---|---|---|---|
| Example 40 | 142 | 4.78 | 27.5 | 168.1 | 1.38 |
| Example 41 | 174 | 4.62 | 29.3 | 165.4 | 1.37 |
| Comparative Example 5 | 174 | 4.50 | 30.1 | 165.5 | 1.37 |

The invention claimed is:

1. A polyester polymerization catalyst comprising as a first metal-containing component at least one selected from aluminum and compounds thereof, and at least one coexisting compound selected from the group consisting of phosphorus compounds represented by the chemical formula 1 and phosphorus compounds represented by the chemical formula 2:

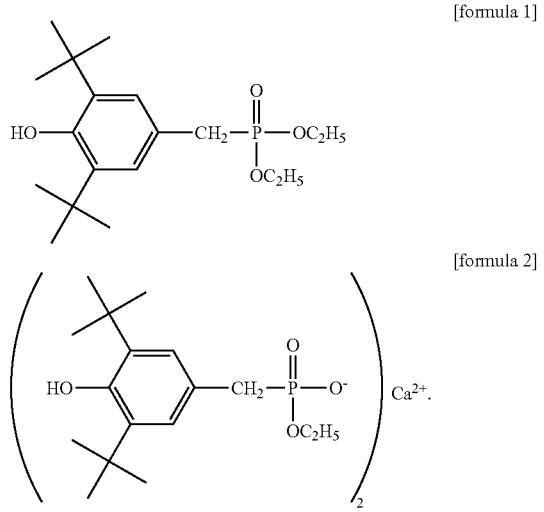

[formula 1]

[formula 2]

2. The polyester polymerization catalyst according to claim 1, characterized in that at least one member selected from the group consisting of phosphorus compounds represented by the chemical formula 1 and phosphorus compounds represented by the chemical formula 2 is a phosphorus compound represented by the formula 1.

3. The polyester polymerization catalyst according to claim 1, characterized in that at least one member selected from the group consisting of phosphorus compounds represented by the chemical formula 1 and phosphorus compounds represented by the chemical formula 2 is a phosphorus compound represented by the formula 2.

4. The polyester polymerization catalyst according to claim 1, characterized in that at least one member selected from aluminum and compounds thereof is at least one member selected from a carboxylate, an inorganic acid salt and a chelate compound.

5. The polyester polymerization catalyst according to claim 2, characterized in that at least one member selected from aluminum and compounds thereof is at least one member selected from a carboxylate, an inorganic acid salt and a chelate compound.

6. The polyester polymerization catalyst according to claim 3, characterized in that at least one member selected from aluminum and compounds thereof is at least one member selected from a carboxylate, an inorganic acid salt and a chelate compound.

7. The polyester polymerization catalyst according to claim 1, characterized in that at least one member selected from aluminum and compounds thereof is at least one member selected from aluminum acetate, aluminum lactate, aluminum chloride, aluminum hydroxide, aluminum chloride hydroxide and aluminum acetylacetonate.

8. The polyester polymerization catalyst according to claim 2, characterized in that at least one member selected from aluminum and compounds thereof is at least one member selected from aluminum acetate, aluminum lactate, aluminum chloride, aluminum hydroxide, aluminum chloride hydroxide and aluminum acetylacetonate.

9. The polyester polymerization catalyst according to claim 3, characterized in that at least one member selected from aluminum and compounds thereof is at least one member selected from aluminum acetate, aluminum lactate, aluminum chloride, aluminum hydroxide, aluminum chloride hydroxide and aluminum acetylacetonate.

10. The polyester polymerization catalyst according to claim 1, characterized in that at least one member selected from aluminum and compounds thereof is at least one member selected from aluminum acetate, aluminum chloride, aluminum hydroxide and aluminum chloride hydroxide.

11. The polyester polymerization catalyst according to claim 2, characterized in that at least one member selected from aluminum and compounds thereof is at least one member selected from aluminum acetate, aluminum chloride, aluminum hydroxide and aluminum chloride hydroxide.

12. The polyester polymerization catalyst according to claim 3, characterized in that at least one member selected from aluminum and compounds thereof is at least one member selected from aluminum acetate, aluminum chloride, aluminum hydroxide and aluminum chloride hydroxide.

13. The polyester polymerization catalyst according to claim 1, characterized in that at least one member selected from aluminum and compounds thereof is aluminum acetate.

14. The polyester polymerization catalyst according to claim 2, characterized in that at least one member selected from aluminum and compounds thereof is aluminum acetate.

15. The polyester polymerization catalyst according to claim 3, characterized in that at least one member selected from aluminum and compounds thereof is aluminum acetate.

16. A polyester comprising:
a polyester polymerization catalyst comprising as a first metal-containing component at least one selected from aluminum and compounds thereof, and at least one coexisting compound selected from the group consisting of phosphorus compounds represented by the chemical formula 1 and phosphorus compounds represented by the chemical formula 2:

formula 1

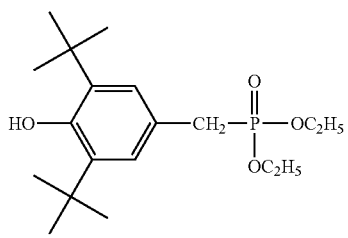

formula 1

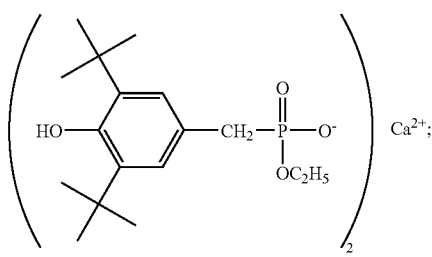

an antimony compound in an amount of less than 50 ppm in terms of an antimony atom;
a germanium compound in an amount of less than 20 ppm in terms of a germanium atom; and
a titanium compound in less than 5 ppm in terms of a titanium atom.

17. A process for production of polyester, comprising:
polymerizing starting compounds for transesterification, solid state polymerization, or esterification followed by polycondensation in the presence of a polyester polymerization catalyst comprising as a first metal-containing component at least one selected from aluminum and compounds thereof, and at least one coexisting compound selected from the group consisting of phosphorus compounds represented by chemical formula 1 and phosphorus compounds represented by chemical formula 2:

Formula 1

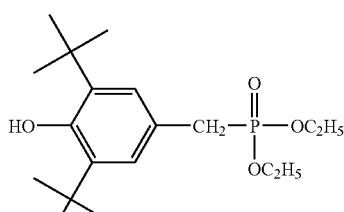

Formula 2

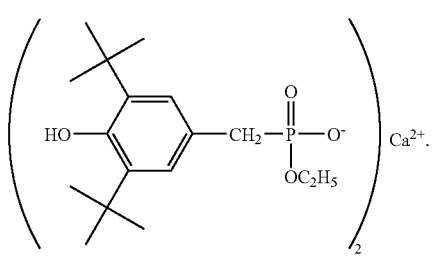

18. A fiber produced by using the polyester of claim 16.
19. A film produced by using the polyester of claim 16.

20. A molded hollow article produced by using the polyester of claim 16.

21. A polyester comprising:
starting compounds for transesterification, solid state polymerization, or esterification, each followed by polycondensation,
the polyester produced by using the polyester polymerization catalyst according to any one of claims 1 and 2 to 15.

22. The polyester of claim 21, wherein the starting compounds comprise a terephthalic compound and an alkylene glycol.

23. A method of producing a film cumprising:
producing a polyester comprising an aluminum compound and a phosphorus compound as a catalyst, an antimony compound in an amount of less than 50 ppm in terms of an antimony atom, a germanium compound in an amount of less than 20 ppm in terms of a germaniun atom, and a titanium compound in less than 5 ppm in terms of a titanium atom, in the presence of a polymerization catalyst comprising as a first metal-containing component at least one selected from aluminum and compounds thereof, and at least one coexisting compound selected from the group consisting of phosphorus compounds represented by the chemical formula 1 and phosphorus compound represented by the chemical formula 2: formula 1 formula 1

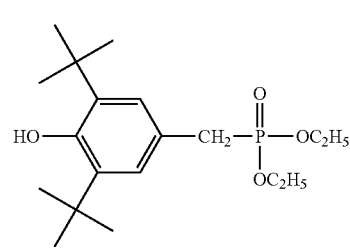

formula 2

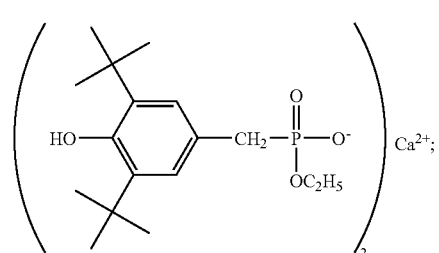

forming a film using the produced polyester.

24. A method of producing a molded hollow article comprising:
producing a polyester comprising an aluminum compound and a phosphorus compound as a catalyst, an antimony compound in an amount of less than 50 ppm in terms of an antimony atom, a germanium compound in an amount of less than 20 ppm in terms of a germanium atom, and a titanium compound in less than 5 ppm in terms of a titaniumn atom, in the presence of a polymerization catalyst comprising as a first metal-containing component at least one selected from aluminum and compounds thereof, and at least one coexisting compound selected from the group consisting of phosphorus compounds represented by the chemical formula 1 and phosphorus compounds represented by the chemical formula 2:

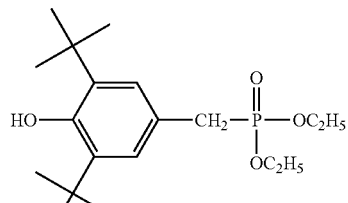

formula 1

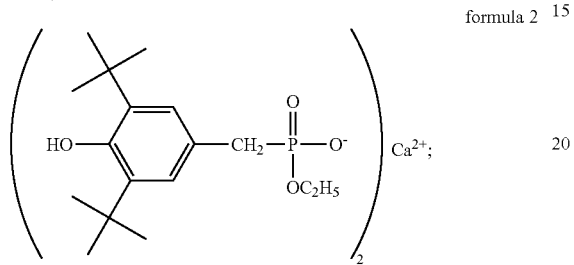

formula 2 forming a molded hollow article using the produced polyester.

25. A method of producing a fiber comprising:

producing a polyester comprising an aluminum compound and a phosphorus compound as a catalyst, an antimony compound in an amount of less than 50 ppm in terms of an antimony atom, a germanium compound in an amount of less than 20 ppm in terms of a germanium atom, and a titanium compound in less than 5 ppm in terms of a titanium atom, in the presence of the a polymerization catalyst comprising as a first metal-containing component at least one selected from aluminum and compounds thereof, and at least one coexisting compound selected from the group consisting of phosphorus compounds represented by the chemical formula 1 and phosphorus compounds represented by the chemical formula 2:

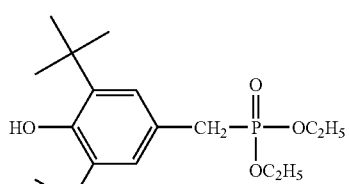

formula 1

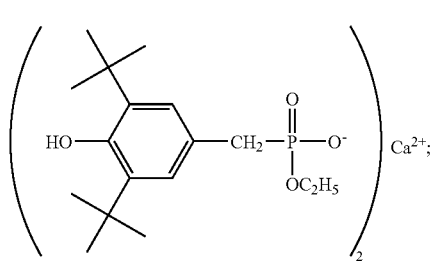

formula 2 forming a fiber using the produced polyester.

* * * * *

UNITED STATES PATENT AND TRADEMARK OFFICE
CERTIFICATE OF CORRECTION

PATENT NO. : 7,132,383 B2  Page 1 of 1
APPLICATION NO. : 10/363648
DATED : November 7, 2006
INVENTOR(S) : Nakajima et al.

It is certified that error appears in the above-identified patent and that said Letters Patent is hereby corrected as shown below:

| Column | Line | |
|---|---|---|
| 49 | Table 2 | Change "AV (equivalent ton⁻¹" to --AV (equivalent/ton$^{-1}$--. |
| 51 | Table 2 | Change "AV (equivalent ton⁻¹" to --AV (equivalent/ton$^{-1}$--. |
| 51 | Table 4 | Change "OHV" to --OHV$_o$--. |
| 56 | 15 | Change "cumprising" to --comprising--. |
| 56 | 21 | Change "germaniun" to --germanium--. |
| 56 | 30 | Change "compound" to --compounds--. |
| 56 | 30 | Change "formula 2: formula 1" to --formula 2:--. |
| 56 | 54 | Change "forming" to --and forming--. |
| 56 | 63 | Change "titaniumn" to --titanium--. |
| 58 | 2 | Change "the a" to --a--. |
| Page 2 | Foreign Pat. Docs. | Change "JP 03 231918      10/1971" to --JP 03 231918      10/1991--. |

Signed and Sealed this

Eleventh Day of March, 2008

JON W. DUDAS
*Director of the United States Patent and Trademark Office*